US008767846B2

(12) United States Patent
Chen et al.

(10) Patent No.: US 8,767,846 B2
(45) Date of Patent: Jul. 1, 2014

(54) JOINT LAYER 3 SIGNALLING CODING FOR MULTICARRIER OPERATION

(75) Inventors: Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 943 days.

(21) Appl. No.: 12/770,427

(22) Filed: Apr. 29, 2010

(65) Prior Publication Data

US 2011/0110441 A1   May 12, 2011

Related U.S. Application Data

(60) Provisional application No. 61/174,443, filed on Apr. 30, 2009.

(51) Int. Cl.
*H04K 1/10* (2006.01)
*H04L 27/28* (2006.01)

(52) U.S. Cl.
USPC ............................. 375/260; 375/295; 375/316

(58) Field of Classification Search
USPC .......................................... 375/260, 295, 316
See application file for complete search history.

(56) References Cited

U.S. PATENT DOCUMENTS

2007/0161377 A1*  7/2007  Kodikara Patabandi et al. .............................. 455/450
2008/0056229 A1*  3/2008  Gholmieh et al. ............ 370/349
2008/0311923 A1* 12/2008  Petrovic et al. ............... 455/450
2009/0232095 A1*  9/2009  Ahn et al. ..................... 370/331
2009/0241004 A1*  9/2009  Ahn et al. ..................... 714/749
2010/0202382 A1*  8/2010  Park et al. ..................... 370/329
2010/0254268 A1* 10/2010  Kim et al. ..................... 370/241
2010/0254329 A1* 10/2010  Pan et al. ...................... 370/329
2010/0303011 A1* 12/2010  Pan et al. ...................... 370/328
2011/0134968 A1*  6/2011  Han et al. ..................... 375/146

FOREIGN PATENT DOCUMENTS

WO      WO2008024321 A2     2/2008

OTHER PUBLICATIONS

International Search Report and Written Opinion—PCT/US2010/033293, International Search Authority—European Patent Office—Jan. 7, 2011.

* cited by examiner

*Primary Examiner* — Shuwang Liu
*Assistant Examiner* — Sung Ahn
(74) *Attorney, Agent, or Firm* — John J. Ketchum

(57) ABSTRACT

Systems and methodologies are described that facilitate encoding layer 3 control information in a multicarrier wireless communication environment. The layer 3 control information can be jointly encoded for a plurality of component carriers. Further, the jointly encoded layer 3 control information for the plurality of component carriers can be included in a data transmission (e.g., PDSCH, PUSCH, . . . ) sent on a component carrier from the plurality of component carriers. Moreover, an allocation for the data transmission on the component carrier can be indicated by a control transmission (e.g., PDCCH, . . . ). For example, the control transmission and the data transmission, which can be scheduled by the control transmission, can be sent on a common component carrier or different component carriers from the plurality of component carriers (e.g., same carrier signalling or cross-carrier signalling can be implemented, . . . ).

25 Claims, 17 Drawing Sheets

US 8,767,846 B2

JOINT LAYER 3 SIGNALLING CODING FOR MULTICARRIER OPERATION

CROSS-REFERENCE TO RELATED APPLICATIONS

This application claims the benefit of U.S. Provisional Patent Application Ser. No. 61/174,443 entitled "JOINT LAYER 3 SIGNALLING CODING FOR MULTICARRIER OPERATION" which was filed Apr. 30, 2009. The entirety of the aforementioned application is herein incorporated by reference.

BACKGROUND

I. Field

The following description relates generally to wireless communications, and more particularly to layer 3 signalling encoding in a multicarrier wireless communication system.

II. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), multi-carrier wireless specifications such as evolution data optimized (EV-DO), one or more revisions thereof, etc.

Generally, wireless multiple-access communication systems can simultaneously support communication for multiple user equipments (UEs). Each UE can communicate with one or more base stations via transmissions on forward and reverse links. The forward link (or downlink) refers to the communication link from base stations to UEs, and the reverse link (or uplink) refers to the communication link from UEs to base stations. Further, communications between UEs and base stations can be established via single-input single-output (SISO) systems, multiple-input single-output (MISO), multiple-input multiple-output (MIMO) systems, and so forth. In addition, UEs can communicate with other UEs (and/or base stations with other base stations) in peer-to-peer wireless network configurations.

In conventional wireless communication environments, one carrier can be used for serving a UE. Thus, downlink traffic can be received by the UE and uplink traffic can be transmitted by the UE using such carrier. More recently, multicarrier operation is supported. Accordingly, a UE can be configured to support a plurality of component carriers. For example, a UE can be configured to support up to five component carriers, and the component carriers can have respective bandwidths up to 20 MHz. Following this example, the UE can be configured to support five component carriers, which can provide 100 MHz bandwidth for downlink and uplink transmissions. Yet, it is to be appreciated that the UE can be configured for fewer than five component carriers (e.g., one, two, three, or four component carriers). Moreover, configuration can be effectuated on a per UE basis.

When one carrier is used for serving a UE, a control transmission, which includes layer 2 control information specified for the UE, can be encoded and sent by a base station to the UE on the carrier. Further, the control transmission can be linked to a data transmission on the carrier. For instance, the control transmission can schedule the data transmission on the carrier. The data transmission can be an uplink data transmission or a downlink data transmission. Moreover, layer 3 control information specified for the UE for the carrier can be embedded in the data transmission sent on the carrier (e.g., embedded in the uplink data transmission or the downlink data transmission sent on the carrier, . . . ).

Moreover, when more than one component carrier is used for serving a UE in multicarrier operation, separate control transmissions can be encoded and transmitted by a base station to the UE. The separate control transmissions can be linked to data transmissions on the more than one component carrier. The separate control transmissions can include respective layer 2 control information specified for the UE for respective data transmissions. For example, if two component carriers are employed to serve the UE, then two control transmissions can be encoded and sent by the base station. Further, the two control transmissions can respectively correspond to two data transmissions. By way of illustration, a first control transmission can indicate an allocation on a first component carrier used for a first data transmission, and a second control transmission can indicate an allocation on a second component carrier used for a second data transmission. However, when a UE is configured to monitor multiple component carriers, conventional approaches for encoding and transmitting layer 3 control information can be inefficient and complex.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating encoding of layer 3 control information in a multicarrier wireless communication environment. The layer 3 control information can be jointly encoded for a plurality of component carriers. Further, the jointly encoded layer 3 control information for the plurality of component carriers can be included in a data transmission (e.g., PDSCH, PUSCH, . . . ) sent on a component carrier from the plurality of component carriers. Moreover, an allocation for the data transmission on the component carrier can be indicated by a control transmission (e.g., PDCCH, . . . ). For example, the control transmission and the data transmission, which can be scheduled by the control transmission, can be sent on a common component carrier or different component carriers from the plurality of component carriers (e.g., same carrier signalling or cross-carrier signalling can be implemented, . . . ).

According to related aspects, a method that facilitates signalling information in a multicarrier wireless communication environment is described herein. The method can include encoding layer 3 control information for a plurality of component carriers jointly, wherein a user equipment (UE) is configured for multicarrier operation with the plurality of component carriers. Further, the method can include sending a data transmission that includes the jointly encoded layer 3 control information for the plurality of component carriers on a second component carrier from the plurality of component carriers, wherein an allocation for the data transmission on the second component carrier is indicated by a control transmission on a first component carrier from the plurality of component carriers.

Another aspect relates to a wireless communications apparatus. The wireless communications apparatus can include a memory that retains instructions related to encoding layer 3 control information for a plurality of component carriers jointly, and sending a data transmission that includes the jointly encoded layer 3 control information for the plurality of component carriers on a second component carrier from the plurality of component carriers, wherein an allocation for the data transmission on the second component carrier is indicated by a control transmission on a first component carrier from the plurality of component carriers and a user equipment (UE) is configured for multicarrier operation with the plurality of component carriers. Further, the wireless communications apparatus can include a processor, coupled to the memory, configured to execute the instructions retained in the memory.

Yet another aspect relates to a wireless communications apparatus that enables encoding information in a multicarrier wireless communication environment. The wireless communications apparatus can include means for encoding layer 3 control information for a plurality of component carriers jointly. Moreover, the wireless communications apparatus can include means for sending a data transmission that includes the jointly encoded layer 3 control information for the plurality of component carriers on a second component carrier from the plurality of component carriers, wherein an allocation for the data transmission on the second component carrier is indicated by a control transmission on a first component carrier from the plurality of component carriers.

Still another aspect relates to a computer program product that can comprise a computer-readable medium. The computer-readable medium can include code for encoding layer 3 control information for a plurality of component carriers jointly. Moreover, the computer-readable medium can include code for sending a data transmission that includes the jointly encoded layer 3 control information for the plurality of component carriers on a second component carrier from the plurality of component carriers, wherein an allocation for the data transmission on the second component carrier is indicated by a Physical Downlink Control Channel (PDCCH) on a first component carrier from the plurality of component carriers.

In accordance with another aspect, a wireless communications apparatus can include a processor, wherein the processor can be configured to encode layer 3 control information for a plurality of component carriers jointly, wherein a user equipment (UE) is configured for multicarrier operation with the plurality of component carriers. Further, the processor can be configured to send a data transmission that includes the jointly encoded layer 3 control information for the plurality of component carriers on a second component carrier from the plurality of component carriers, wherein an allocation for the data transmission on the second component carrier is indicated by a Physical Downlink Control Channel (PDCCH) on a first component carrier from the plurality of component carriers.

According to other aspects, a method that facilitates evaluating received information in a multicarrier wireless communication environment is described herein. The method can include receiving a data transmission that includes jointly encoded layer 3 control information for a plurality of component carriers on a second component carrier from the plurality of component carriers, wherein an allocation for the data transmission on the second component carrier is indicated by a control transmission on a first component carrier from the plurality of component carriers and a user equipment (UE) is configured for multicarrier operation with the plurality of component carriers. Moreover, the method can include decoding the jointly encoded layer 3 control information for the plurality of component carriers.

Another aspect relates to a wireless communications apparatus. The wireless communications apparatus can include a memory that retains instructions related to receiving a data transmission that includes jointly encoded layer 3 control information for a plurality of component carriers on a second component carrier from the plurality of component carriers, and decoding the jointly encoded layer 3 control information for the plurality of component carriers, wherein an allocation for the data transmission on the second component carrier is indicated by a control transmission on a first component carrier from the plurality of component carriers and a user equipment (UE) is configured for multicarrier operation with the plurality of component carriers. Further, the wireless communications apparatus can include a processor, coupled to the memory, configured to execute the instructions retained in the memory.

Yet another aspect relates to a wireless communications apparatus that enables decoding information in a multicarrier wireless communication environment. The wireless communications apparatus can include means for receiving a data transmission that includes jointly encoded layer 3 control information for a plurality of component carriers on a second component carrier from the plurality of component carriers, wherein an allocation for the data transmission on the second component carrier is indicated by a control transmission on a first component carrier from the plurality of component carriers. Further, the wireless communications apparatus can include means for decoding the jointly encoded layer 3 control information for the plurality of component carriers.

Still another aspect relates to a computer program product that can comprise a computer-readable medium. The computer-readable medium can include code for receiving a data transmission that includes jointly encoded layer 3 control information for a plurality of component carriers on a second component carrier from the plurality of component carriers, wherein an allocation for the data transmission on the second component carrier is indicated by a Physical Downlink Control Channel (PDCCH) on a first component carrier from the plurality of component carriers. Moreover, the computer-readable medium can include code for decoding the jointly encoded layer 3 control information for the plurality of component carriers.

In accordance with another aspect, a wireless communications apparatus can include a processor, wherein the processor can be configured to receive a data transmission that includes jointly encoded layer 3 control information for a plurality of component carriers on a second component carrier from the plurality of component carriers, wherein an allocation for the data transmission on the second component carrier is indicated by a Physical Downlink Control Channel (PDCCH) on a first component carrier from the plurality of component carriers and a user equipment (UE) is configured for multicarrier operation with the plurality of component carriers. Moreover, the processor can be configured to decode the jointly encoded layer 3 control information for the plurality of component carriers.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
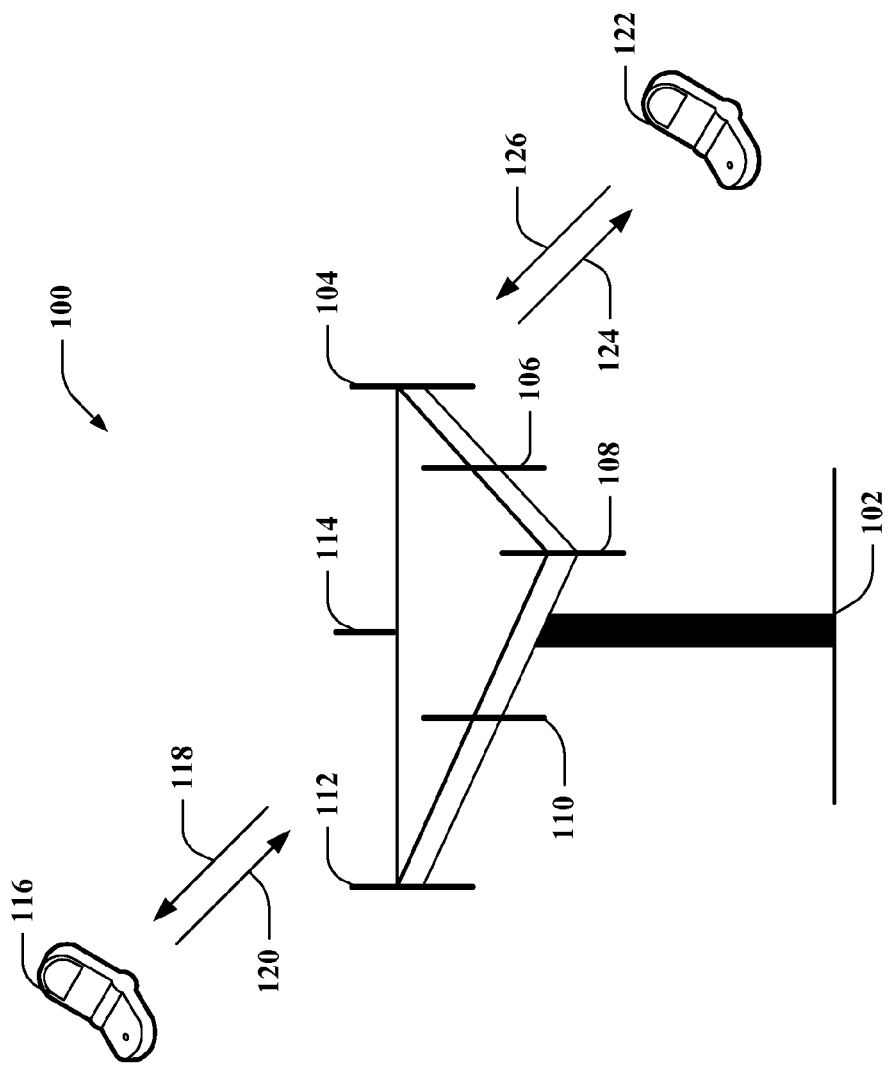
FIG. 1 is an illustration of a wireless communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspects(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Various techniques described herein can be used for various wireless communication systems, such as code division multiple access (CDMA) systems, time division multiple access (TDMA) systems, frequency division multiple access (FDMA) systems, orthogonal frequency division multiple access (OFDMA) systems, single carrier-frequency division multiple access (SC-FDMA) systems, and other such systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95, and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long- range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA.

Furthermore, various aspects are described herein in connection with a user equipment (UE). A UE can refer to a device providing voice and/or data connectivity. A UE can be connected to a computing device such as a laptop computer or desktop computer, or it can be a self-contained device such as a personal digital assistant (PDA). A UE can also be called a system, subscriber unit, subscriber station, mobile station, mobile, remote station, remote terminal, mobile device, user terminal, terminal, wireless communication device, user agent, user device, or access terminal. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various aspects are described herein in connection with a base station. A base station can be utilized for communicating with UE(s) and can also be referred to as an access point, Node B, Evolved Node B (eNodeB, eNB) or some other terminology. A base station can refer to a device in an access network that communicates over the air interface, through one or more sectors, with UEs. The base station can act as a router between the wireless terminal and the rest of the access network, which can include an Internet Protocol (IP) network, by converting received air interface frames to IP packets. The base station can also coordinate management of attributes for the air interface.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various aspects will be presented in terms of systems that can include a number of devices, components, modules, and the like. It is to be understood and appreciated that the various systems can include additional devices, components, modules, etc. and/or one or more of the devices, components, modules etc. discussed in connection with the figures need not be included. A combination of these approaches can also be used.

Referring now to FIG. 1, a system 100 is illustrated in accordance with various aspects presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more user equipments (UEs) such as UE 116 and UE 122; however, it is to be appreciated that base station 102 can communicate with substantially any number of UEs similar to UE 116 and UE 122. UE 116 and UE 122 can be, for example, cellular phones, smart phones, laptops, handheld communication devices, handheld computing devices, satellite radios, global positioning systems, PDAs, and/or any other suitable device for communicating over system 100. As depicted, UE 116 is in communication with antennas 112 and 114, where antennas 112 and 114 transmit information to UE 116 over a forward link 118 and receive information from UE 116 over a reverse link 120. Moreover, UE 122 is in communication with antennas 104 and 106, where antennas 104 and 106 transmit information to UE 122 over a forward link 124 and receive information from UE 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to UEs in a sector of the areas covered by base station 102. In communication over forward links 118 and 124, the transmitting antennas of base station 102 can utilize beamforming to improve signal-to-noise ratio of forward links 118 and 124 for UE 116 and UE 122. Also, while base station 102 utilizes beamforming to transmit to UE 116 and UE 122 scattered randomly through an associated coverage, UEs in neighboring cells can be subject to less interference as compared to a base station transmitting through a single antenna to all its UEs.

Legacy wireless communication environments typically use one carrier to serve a UE (e.g., UE 116, UE 122, . . . ) for uplink and downlink transmissions. In contrast, more recent wireless communication environments (e.g., Long Term Evolution-Advanced (LTE-A), . . . ) support multicarrier operation. For instance, UE 116 and UE 122 can be configured via Radio Resource Control (RRC) to monitor multiple component carriers. It is to be appreciated that the terms carrier and component carrier are used interchangeably herein.

UE 116 and UE 122 can be configured to support multiple component carriers. For example, a UE (e.g., UE 116, UE 122, . . . ) can be configured to support up to five component carriers, and the component carriers can have respective bandwidths up to 20 MHz. Following this example, the UE can be configured to support five component carriers, which can provide 100 MHz bandwidth for downlink and uplink transmissions. Yet, it is to be appreciated that the UE can be configured for fewer than five component carriers (e.g., one, two, three, or four component carriers). It is contemplated, however, that the claimed subject matter is not limited to the foregoing example (e.g., more than or fewer than five component carriers can be supported, respective bandwidths of the component carriers can differ from 20 MHz, . . . ). Moreover, configuration can be effectuated on a per UE basis.

Design of control for multicarrier operation can be based upon considerations of involved overhead and efficiency, resulting reliability, robustness, complexity, and so on. More particularly, layer 3 control information for a plurality of component carriers can be jointly encoded for multicarrier operation in system 100. Further, the jointly encoded layer 3 control information for the plurality of component carriers can be sent as part of a data transmission (e.g., data channel, . . . ) over one of the plurality of component carriers. For instance, the jointly encoded layer 3 control information can be embedded in the data transmission sent on the one of the plurality of component carriers. In contrast to the layer 3 control information which can be jointly encoded for the plurality of component carriers, layer 2 control information can be separately encoded and transmitted for the plurality of component carriers in system 100.

Figure 2:
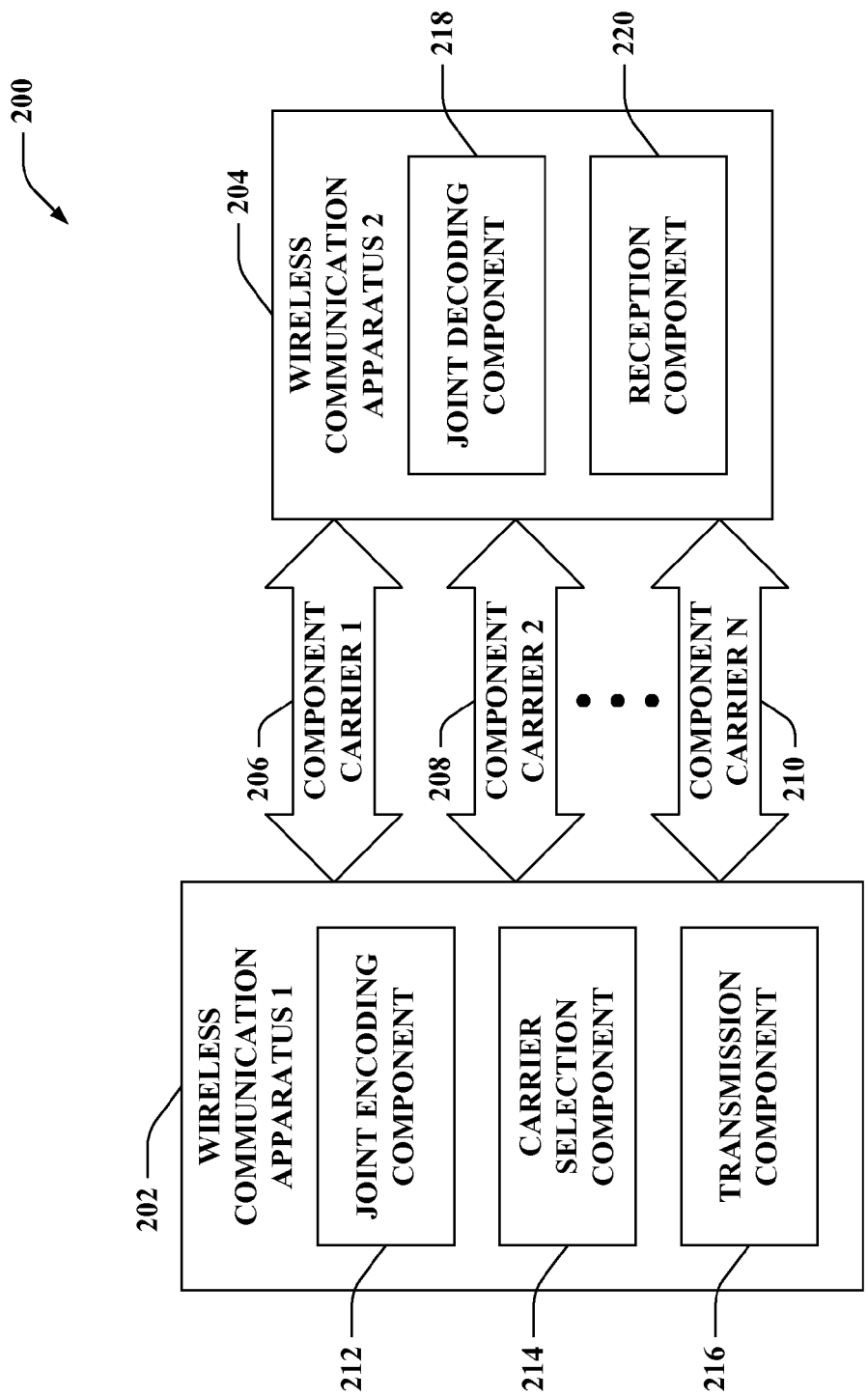
FIG. 2 is an illustration of an example system that employs joint layer 3 control information encoding in a wireless communication environment.

Now turning to FIG. 2, illustrated is a system 200 that employs joint layer 3 control information encoding in a wireless communication environment. System 200 includes a wireless communication apparatus 1 202 that transmits information, signals, data, instructions, commands, bits, symbols, and the like over a channel (e.g., uplink, downlink, . . . ) to a wireless communication apparatus 2 204. Wireless communication apparatus 1 202, for instance, can be a base station (e.g., base station 102 of FIG. 1, . . . ), a UE (e.g., UE 116 of FIG. 1, UE 122 of FIG. 1, . . . ), or the like. Moreover, wireless communication apparatus 2 204 can be, for example, a UE (e.g., UE 116 of FIG. 1, UE 122 of FIG. 1, . . . ), a base station (e.g., base station 102 of FIG. 1, . . . ), etc.

System 200 can include substantially any number of component carriers (e.g., component carrier 1 206, component carrier 2 208, . . . , component carrier N 210, where N can be substantially any integer). For example, system 200 can include five component carriers (e.g., N can equal five, . . . ); yet, the claimed subject matter is not so limited. Component carrier 1 206, component carrier 2 208, . . . , and component carrier N 210 collectively can be referred to as the set of component carriers 206-210. Further, one or more component carriers (e.g., one component carrier, more than one but less than N component carriers, N component carriers, . . . ) from the set of component carriers 206-210 can be used for downlink and uplink transmissions between wireless communication apparatus 1 202 and wireless communication apparatus 2 204. Moreover, many of the examples described herein relate to use of a plurality of component carriers (e.g., more than one but less than N component carriers, N component carriers, . . . ) from the set of component carriers 206-210 for uplink and downlink transmissions between wireless communication apparatus 1 202 and wireless communication apparatus 2 204; thus, a UE can be configured with the plurality of component carriers.

Wireless communication apparatus 1 202 can further include a joint encoding component 212, a carrier selection component 214, and a transmission component 216. Joint encoding component 212 can jointly encode layer 3 control information (e.g., layer 3 signalling information, . . . ) for the plurality of component carriers from the set of component carriers 206-210 used for uplink and downlink transmissions between wireless communication apparatus 1 202 and wireless communication apparatus 2 204. Further, carrier selection component 214 can choose a component carrier upon which the jointly encoded layer 3 control information can be transmitted. Moreover, transmission component 216 can send the jointly encoded layer 3 control information upon the component carrier chosen by carrier selection component 214.

The jointly encoded layer 3 control information for the plurality of component carriers yielded by joint encoding component 212 can be embedded in a data transmission sent upon the component carrier chosen by carrier selection component 214. For example, the data transmission can be a Physical Downlink Shared Channel (PDSCH) sent on the component carrier (e.g., wireless communication apparatus 1 202 can be a base station and wireless communication apparatus 2 204 can be a UE, . . . ). According to another example, the data transmission can be a Physical Uplink Shared Channel (PUSCH) sent on the component carrier (e.g., wireless communication apparatus 1 202 can be a UE and wireless communication apparatus 2 204 can be a base station, . . . ).

Carrier selection component 214 can choose the component carrier upon which the jointly encoded layer 3 control information can be transmitted (e.g., by transmission component 216, . . . ). By way of example, carrier selection component 214 can choose an anchor carrier (e.g., primary carrier, . . . ) as the component carrier upon which the jointly encoded layer 3 control information can be transmitted. Following this example, a component carrier from the set of component carriers 206-210 can be designated as an anchor carrier for a UE (e.g., wireless communication apparatus 1 202 or wireless communication apparatus 2 204, . . . ), and the component carrier designated as the anchor carrier can be elected by carrier selection component 214 for sending the jointly encoded layer 3 control information. Moreover, the anchor carrier can be configured by layer 3 configuration on a semi-static basis. The designation of the component carrier as the anchor carrier, for instance, can be based upon carrier reliability. Thus, the jointly encoded layer 3 control information for the plurality of component carriers can be transmitted on the anchor carrier, which can be recognized as most reliable. Accordingly, use of a reliable component carrier (e.g., the anchor carrier, . . . ) can enable the jointly encoded layer 3 control information to be reliably sent to wireless communication apparatus 2 204. Yet, it is to be appreciated that other metrics can be leveraged in connection with selecting an anchor carrier.

Pursuant to another example, carrier selection component 214 can select the component carrier upon which the jointly encoded layer 3 control information can be transmitted based upon a control transmission (e.g., layer 2 control information, . . . ). For instance, the control transmission can be a Physical Downlink Control Channel (PDCCH). By way of illustration, the PDCCH can be received from wireless communication apparatus 2 204. In accordance with another illustration, the PDCCH can be sent by wireless communication apparatus 1 202. Moreover, the PDCCH can schedule the data transmission (e.g., PUSCH, PDSCH, . . . ) in which the jointly encoded layer 3 control information can be embedded. Thus, an allocation of a component carrier as scheduled by the PDCCH can be recognized by carrier selection component 214. It is contemplated that the component carrier can be an anchor carrier, for example; however, the claimed subject matter is not so limited.

Further, wireless communication apparatus 2 204 can include a joint decoding component 218 and a reception component 220. Reception component 220 can receive the data transmission (e.g., PDSCH, PUSCH, . . . ) that includes the jointly encoded layer 3 control information embedded therein. For instance, reception component 220 can receive the data transmission on the component carrier from the set of component carriers 206-210 upon which the jointly encoded layer 3 control information for the plurality of component carriers is sent by wireless communication apparatus 1 202. For example, the component carrier can be recognized as including the jointly encoded layer 3 control information as a function of scheduling (e.g., effectuated by wireless communication apparatus 2 204, detected from a received PDCCH, . . . ), anchor carrier designation, and so forth.

Joint decoding component 218 can decode the jointly encoded layer 3 control information received by reception component 220. Thus, joint decoding component 218 can yield layer 3 control information for the plurality of component carriers by decoding the jointly encoded layer 3 control information signaled through a common data transmission (e.g., the PDSCH, PUSCH, . . . ) on one component carrier (e.g., the component carrier from the set of component carriers 206-210 upon which the jointly encoded layer 3 control information for the plurality of component carriers is sent by wireless communication apparatus 1 202, . . . ).

While system 200 supports jointly encoding and transmitting layer 3 control information, layer 2 control information can be separately encoded and transmitted. Separate control transmissions (e.g., separate PDCCHs, . . . ) can be encoded and transmitted by a base station to a UE (e.g., by wireless communication apparatus 1 202 to wireless communication apparatus 2 204, by wireless communication apparatus 2 204 to wireless communication apparatus 1 202, . . . ). The separate control transmissions can be linked to data transmissions (e.g., PDSCHs, PUSCHs, . . . ) on the plurality of component carriers. The separate control transmissions can include respective layer 2 control information specified for the UE for respective data transmissions. For example, if two component carriers are employed to serve the UE, then two control transmissions can be encoded and sent by the base station. Further, the two control transmissions can respectively correspond to two data transmissions. By way of illustration, a first control transmission (e.g., a first PDCCH, . . . ) can indicate an allocation on a first component carrier used for a first data transmission (e.g., a first PDSCH, a first PUSCH, . . . ), and a second control transmission (e.g., a second PDCCH, . . . ) can indicate an allocation on a second component carrier used for a second data transmission (e.g., a second PDSCH, a second PUSCH, . . . ). For instance, a PDCCH in one component carrier can schedule PDSCH/PUSCH in one component carrier for the UE. Further, multiple PDCCHs can be separately encoded and transmitted to schedule PDSCH/PUSCH in multiple component carriers for the UE.

For example, layer 2 control information can include an uplink assignment, a downlink assignment, an uplink power control command, a paging indicator, or the like. An uplink assignment can include a Resource Block (RB) assignment, a transport block size, a retransmission sequence number, a power control command, a cyclic shift, a combination thereof, and so forth. Further, a downlink assignment can include a RB assignment, a transport block size, a Hybrid Automatic Repeat Request (HARD) process number, a redundancy version index, an uplink power control command, a combination thereof, and so forth. By way of another example, layer 3 control information can include RRC messages. For instance, the RRC messages can relate to one or more of the following: broadcast of system information; paging; establishment, maintenance, and release of an RRC connection; security functions; establishment, configuration, maintenance, and release of point-to-point Radio Bearers; UE measurement reporting and control thereof; handover; cell selection and reselection and control thereof; and so forth. It is to be appreciated, however, that the claimed subject matter is not limited to the foregoing examples of layer 2 control information and layer 3 control information.

Figure 3:
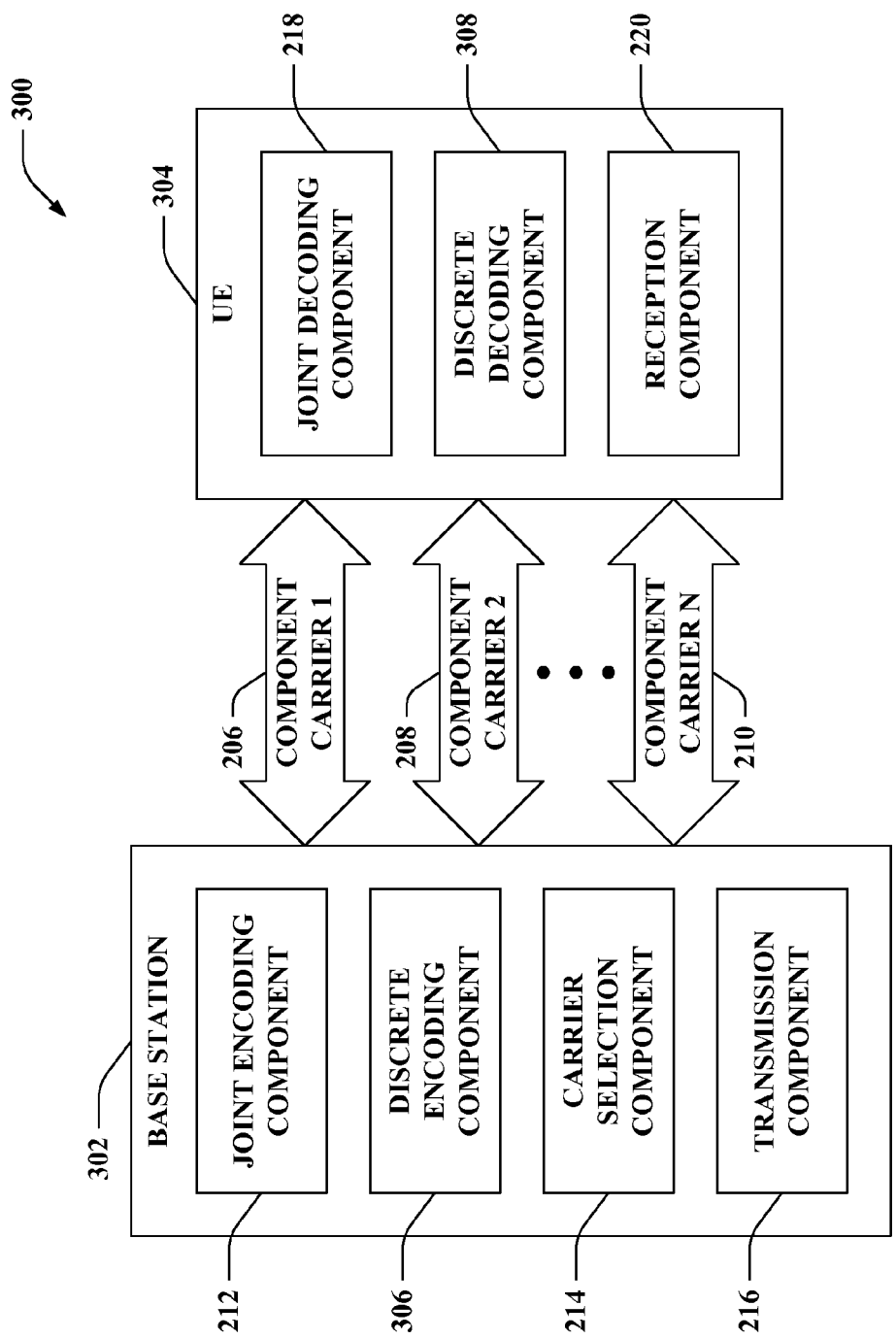
FIG. 3 is an illustration of an example system that jointly encodes layer 3 control information and separately encodes layer 2 control information in a multicarrier wireless communication environment.

Now referring to FIG. 3, illustrated is a system 300 that jointly encodes layer 3 control information and separately encodes layer 2 control information in a multicarrier wireless communication environment. System 300 includes a base station 302 (e.g., wireless communication apparatus 1 202 of FIG. 2, . . . ) that can transmit and/or receive information, signals, data, instructions, commands, bits, symbols, and the like. Base station 302 can communicate with a UE 304 (e.g., wireless communication apparatus 2 204 of FIG. 2, . . . ) via the forward link and/or reverse link upon one or more component carriers from the set of component carriers 206-210. UE 304 can transmit and/or receive information, signals, data, instructions, commands, bits, symbols, and the like. Moreover, although not shown, it is contemplated that any number of base stations similar to base station 302 can be included in system 300 and/or any number of UEs similar to UE 304 can be included in system 300.

Again, reference is made to the aforementioned example where a plurality of component carriers from the set of component carriers 206-210 (e.g., two, three, . . . , or N component carriers from the set of component carriers 206-210, . . . ) can be used for uplink and downlink transmissions between base station 302 and UE 304. Base station 302 can include joint encoding component 212, carrier selection component 214, and transmission component 216 as described herein. Further, base station 302 can include a discrete encoding component 306 that separately encodes layer 2 control information for the plurality of component carriers. Moreover, carrier selection component 214 can choose respective component carriers upon which the separately encoded layer 2 control information can be transmitted. Further, transmission component 216 can send the separately encoded layer 2 control information upon the respective component carriers chosen by carrier selection component 214.

Separately encoded layer 2 control information yielded by discrete encoding component 306 can be included in respective control transmissions sent upon the respective component carriers chosen by carrier selection component 214. For example, the respective control transmissions can be respective PDCCHs sent upon the respective component carriers (e.g., sent by base station 302 to UE 304, . . . ). Further, a PDCCH sent upon a component carrier can individually schedule one data transmission; thus, a PDCCH can individually schedule one PDSCH or one PUSCH.

Discrete encoding component 306 can encode the layer 2 control information for UE 304 using a separate PDCCH for each of the plurality of component carriers. According to an example, a PDCCH sent on a particular component carrier (e.g., from the plurality of component carriers, . . . ) can indicate an allocation (e.g., for a PDSCH or a PUSCH, . . . ) on the particular component carrier, which can be referred to as same carrier signalling (e.g., individual PDCCH, . . . ). Thus, a PDCCH sent to UE 304 upon component carrier 1 206 can include encoded layer 2 control information that schedules a PDSCH or a PUSCH upon component carrier 1 206; yet, the claimed subject matter is not so limited. By way of another example, a PDCCH sent on a particular component carrier (e.g., from the plurality of component carriers, . . . ) can indicate an allocation (e.g., for a PDSCH or a PUSCH, . . . ) on the particular component carrier or a different component carrier (e.g., from the plurality of component carriers, . . . ); this example can be referred to as cross-carrier signalling (e.g., cross-carrier PDCCH, . . . ). Following this example, a PDCCH sent to UE 304 upon component carrier 1 206 can include encoded layer 2 control information that schedules a PDSCH or a PUSCH upon component carrier 1 206 or upon component carrier 2 208; however, it is to be appreciated that the claimed subject matter is not limited to this illustration.

Moreover, UE 304 can include joint decoding component 218 and reception component 220 as described herein. UE 304 can also include a discrete decoding component 308 that decodes received control transmissions (e.g., PDCCHs, . . . ) obtained by reception component 220 to yield the layer 2 control information. For instance, reception component 220 can receive separate PDCCHs on the plurality of component carriers employed for transmissions between base station 302 and UE 304 as part of the multicarrier operation. Further, discrete decoding component 308 can evaluate the separate PDCCHs on the plurality of component carriers to yield layer 2 control information that respectively corresponds to the plurality of component carriers.

Figure 4:
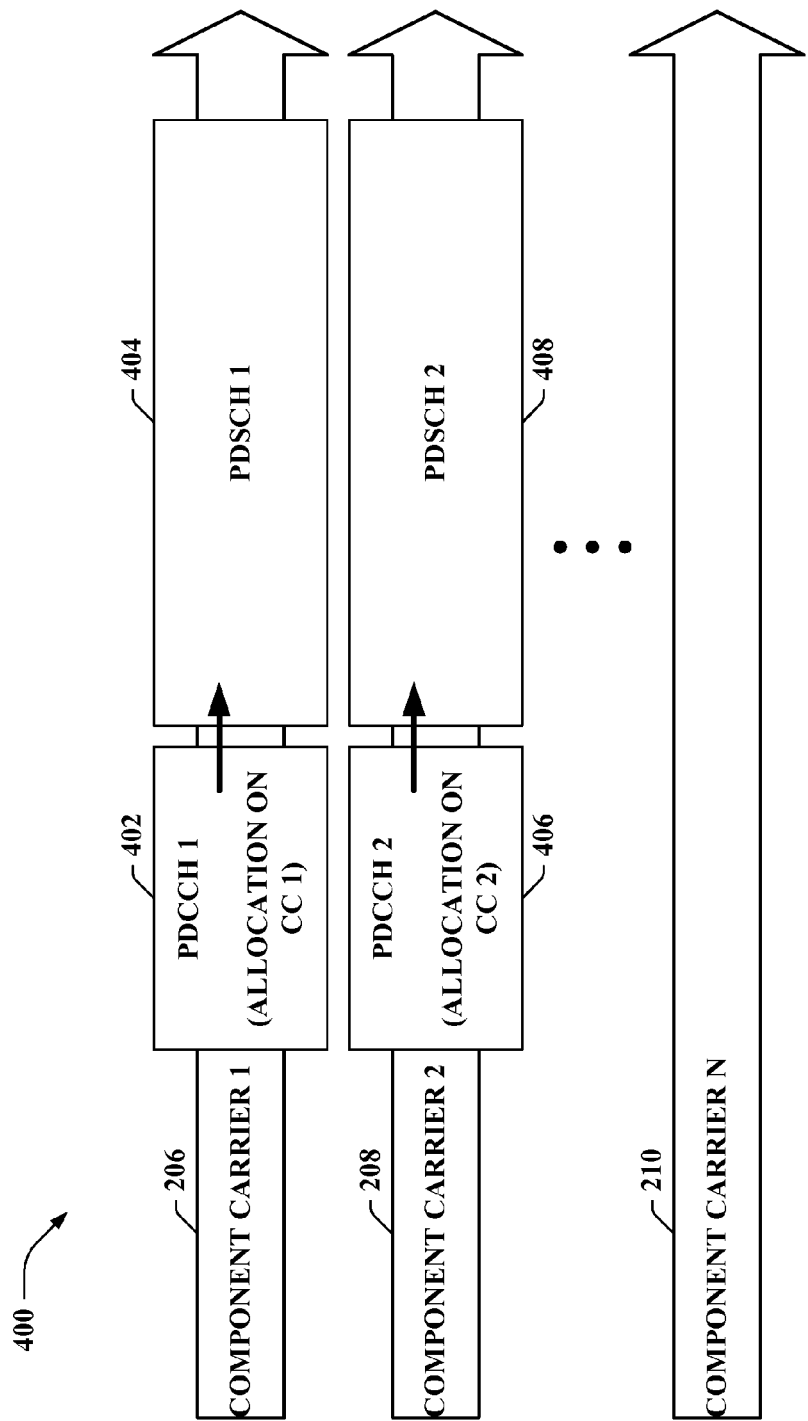
FIGS. 4-6 are illustrations of example schemes for encoding and transmitting layer 2 control information and layer 3 control information in a multicarrier wireless communication environment.
Figure 5:
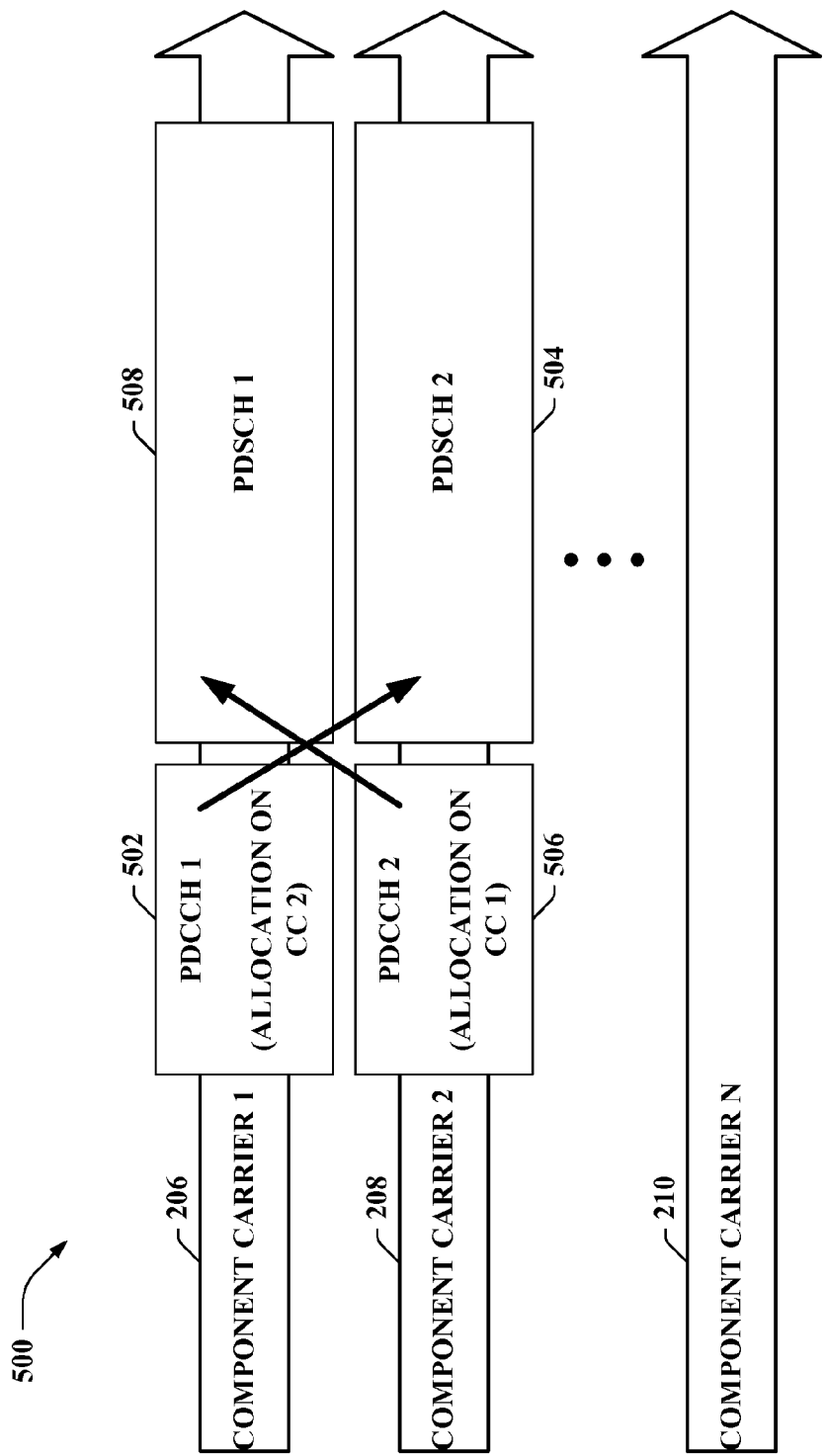
Figure 6:
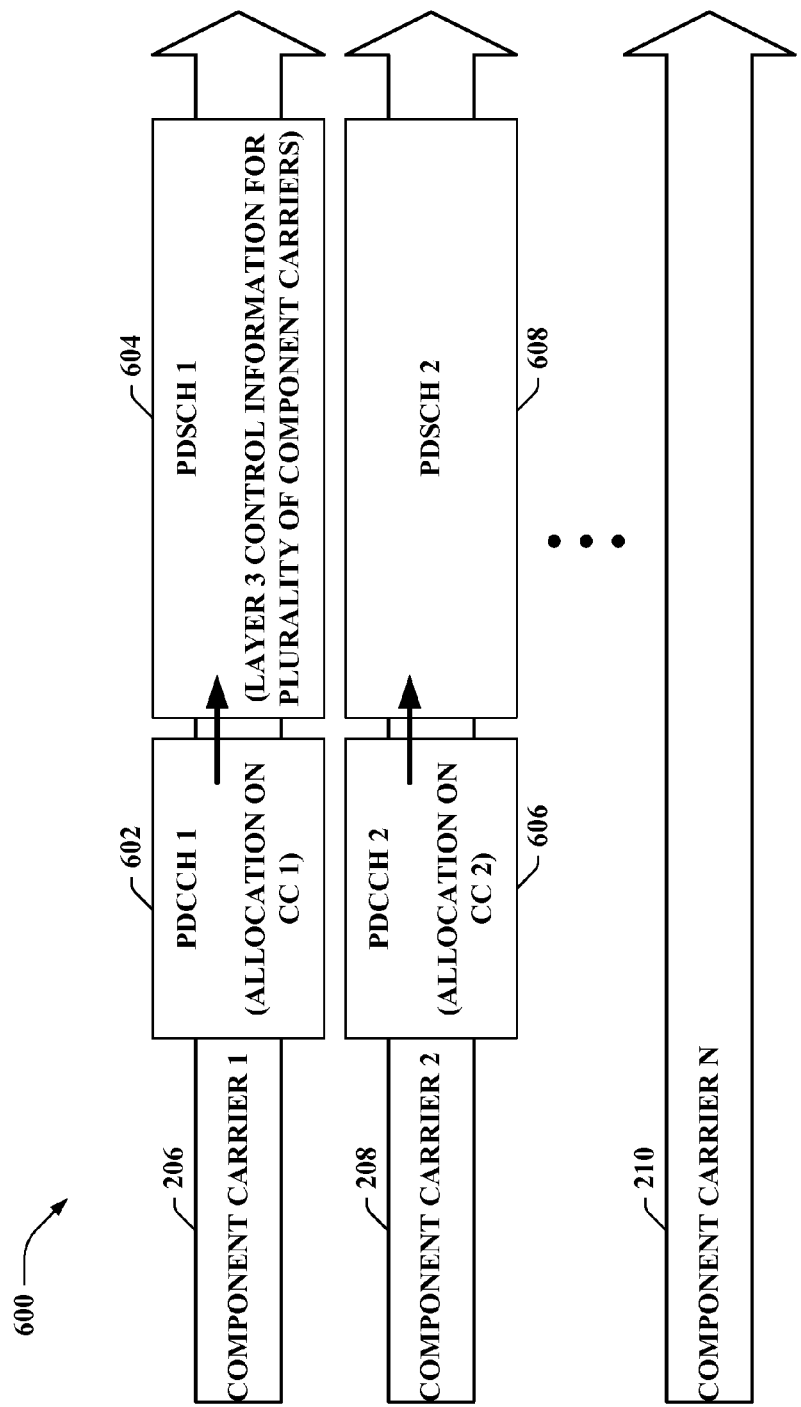

Now referring to FIGS. 4-6, illustrated are example schemes for encoding and transmitting layer 2 control information and layer 3 control information in a multicarrier wireless communication environment. While the depicted examples relate to the data transmission (e.g., data channel, . . . ) scheduled by a PDCCH being a PDSCH, it is contemplated that these examples can be extended to the data transmission scheduled by a PDCCH being a PUSCH. The depicted examples show component carrier 1 206 and component carrier 2 208 being used for transmissions between a base station and a UE (e.g., between wireless communication apparatus 1 202 and wireless communication apparatus 2 204 of FIG. 2, between base station 302 and UE 304 of FIG. 3, . . . ); thus, component carrier 1 206 and component carrier 2 208 are the plurality of component carriers from the set of component carriers 206-210 as described herein. Pursuant to such examples, other component carriers in the set of component carriers 206-210, such as component carrier N 210, can be unused for such transmissions between the base station and the UE. These examples are provided for illustration purposes, and it is to be appreciated that the claimed subject matter is not so limited.

Turning to FIG. 4, illustrated is an example scheme 400 that employs same carrier signalling when encoding layer 2 control information in a multicarrier wireless communication environment. Layer 2 control information for component carrier 1 206 and component carrier 2 208 can be separately encoded and included in respective control transmissions (e.g., respective PDCCHs, . . . ). For instance, the layer 2 control information for component carrier 1 206 and component carrier 2 208 can be separately encoded by discrete encoding component 306 of FIG. 3. Further, the separately encoded layer 2 control information included in the PDCCHs can be decoded by discrete decoding component 308 of FIG. 3 (e.g., to identify respective corresponding allocations on component carrier 1 206 and component carrier 2 208, . . . ).

When employing same carrier signalling, a PDCCH sent on a component carrier from a base station to a UE can indicate an allocation on the same component carrier. As illustrated, a PDCCH 1 402 can be transmitted on component carrier 1 206. Further, PDCCH 1 402 can include separately encoded layer 2 control information corresponding to component carrier 1 206 that indicates an allocation on component carrier 1 206 (CC 1). The allocation on component carrier 1 206 indicated by the separately encoded layer 2 control information can be a PDSCH 1 404 sent over component carrier 1 206.

Similarly, a PDCCH 2 406 can be transmitted on component carrier 2 208. Further, PDCCH 2 406 can include separately encoded layer 2 control information corresponding to component carrier 2 208 that indicates an allocation on component carrier 2 208 (CC 2). The allocation on component carrier 2 208 indicated by the separately encoded layer 2 control information can be a PDSCH 2 408 sent over component carrier 2 208.

While FIG. 4 depicts PDSCH 1 404 and PDSCH 2 408 being linked to PDCCH 1 402 and PDCCH 2 406, respectively, it is contemplated that either or both of PDCCH 1 402 and PDCCH 2 406 can be linked to a corresponding PUSCH (e.g., PDCCH 1 402 can include separately encoded layer 2 control information that indicates an allocation on a corresponding PUSCH sent over component carrier 1 206, PDCCH 2 406 can include separately encoded layer 2 control information that indicates an allocation on a corresponding PUSCH sent over component carrier 2 208, . . . ).

With reference to FIG. 5, illustrated is an example scheme 500 that employs cross-carrier signalling when encoding layer 2 control information in a multicarrier wireless communication environment. Layer 2 control information for component carrier 1 206 and component carrier 2 208 can be separately encoded and included in respective control transmissions (e.g., respective PDCCHs, . . . ). For instance, the layer 2 control information for component carrier 1 206 and component carrier 2 208 can be separately encoded by discrete encoding component 306 of FIG. 3. Further, the separately encoded layer 2 control information included in the PDCCHs can be decoded by discrete decoding component 308 of FIG. 3 (e.g., to identify respective corresponding allocations on component carrier 1 206 and component carrier 2 208, . . . ).

When employing cross-carrier signalling, a PDCCH sent on a component carrier from a base station to a UE can indicate an allocation on the same component carrier or a different component carrier. For example, an indicator can be included in the PDCCH that specifies an associated data transmission (e.g., PDSCH, PUSCH, . . . ). Following this example, the indicator can be a three bit indicator (e.g., 000 can signify that the data transmission will be sent on component carrier 1 206, 001 can signify that the data transmission will be sent on component carrier 2 208, 010 can signify that the data transmission will be sent on a component carrier 3 (not shown), . . . ). Thus, the indicator can be utilized by the UE to recognize a component carrier upon which the associated data transmission will be sent. By way of another example, a predefined mapping between component carriers can be leveraged by the base station and the UE (e.g., a PDCCH sent on a first component carrier can map to a data transmission (PDSCH or PUSCH) on a second component carrier where the first component carrier and the second component carrier can be the same or different, . . . ). However, the claimed subject matter is not limited to the foregoing examples.

As illustrated, a PDCCH 1 502 can be transmitted on component carrier 1 206. Further, PDCCH 1 502 can include separately encoded layer 2 control information corresponding to component carrier 2 208 that indicates an allocation on component carrier 2 208 (CC 2). The allocation on component carrier 2 208 indicated by the separately encoded layer 2 control information can be a PDSCH 2 504 sent over component carrier 2 208.

Similarly, a PDCCH 2 506 can be transmitted on component carrier 2 208. Further, PDCCH 2 506 can include separately encoded layer 2 control information corresponding to component carrier 1 206 that indicates an allocation on component carrier 1 206 (CC 1). The allocation on component carrier 1 206 indicated by the separately encoded layer 2 control information can be a PDSCH 1 508 sent over component carrier 1 206.

While FIG. 5 depicts PDSCH 2 504 and PDSCH 1 508 being linked to PDCCH 1 502 and PDCCH 2 506, respectively, it is contemplated that either or both of PDCCH 1 502 and PDCCH 2 506 can be linked to a corresponding PUSCH (e.g., PDCCH 1 502 can include separately encoded layer 2 control information that indicates an allocation on a corresponding PUSCH sent over component carrier 2 208, PDCCH 2 506 can include separately encoded layer 2 control information that indicates an allocation on a corresponding PUSCH sent over component carrier 1 206, . . . ). According to another example, cross-carrier signalling can be shown by FIG. 4 where both PDCCH 1 402 and PDCCH 2 406 indicate allocations on the same component carriers.

With reference to FIG. 6, illustrated is an example scheme 600 that employs joint encoding for layer 3 control information in a multicarrier wireless communication environment. Layer 3 control information for component carrier 1 206 and component carrier 2 208 can be jointly encoded and included in a common data transmission. As depicted, the common data transmission can be a PDSCH; however, it is further contemplated that the common data transmission can be a PUSCH. For instance, the layer 3 control information for component carrier 1 206 and component carrier 2 208 can be jointly encoded by joint encoding component 212 of FIG. 2. Further, the jointly encoded layer 3 control information included in the common data transmission can be decoded by joint decoding component 218 of FIG. 2.

For UE specific layer 3 signalling, same carrier signalling (e.g., individual PDCCH, . . . ) and joint encoding for layer 3 control information or cross-carrier signalling (e.g., cross-carrier PDCCH, . . .) and joint encoding for layer 3 control information can be leveraged. As shown, a PDCCH 1 602 can be transmitted on component carrier 1 206. Further, PDCCH 1 602 can include separately encoded layer 2 control information that indicates an allocation. The indicated allocation can be on the same component carrier (e.g., component carrier 1 206, . . . ) if same carrier signalling is leveraged, for example. By way of further example, the indicated allocation can be on the same component carrier (e.g., component carrier 1 206, . . . ) or a different component carrier (e.g., component carrier 2 208, . . . , or component carrier N 210, . . . ) if cross-carrier signalling is leveraged. According to the depicted example, the separately encoded layer 2 control information included in PDCCH 1 602 can indicate an allocation on component carrier 1 206 (CC 1). The allocation on component carrier 1 206 indicated by the separately encoded layer 2 control information can be a PDSCH 1 604 sent over component carrier 1 206. Moreover, layer 3 control information for a plurality of component carriers (e.g., component carrier 1 206 and component carrier 2 208 in the illustrated example, . . . ) can be jointly encoded, and the jointly encoded layer 3 control information can be included in PDSCH 1 604 sent on component carrier 1 206 (e.g., the jointly encoded layer 3 control information can be part of a payload of PDSCH 1 604, . . . ).

Although not shown, it is contemplated that cross-carrier signalling can be employed, which can be similar to the example depicted in FIG. 5. Accordingly, PDSCH 2 504 sent on component carrier 2 208 can include the jointly encoded layer 3 control information for the plurality of component carriers. Yet, the claimed subject matter is not so limited.

According to an example, PDSCH 1 604 can include the jointly encoded layer 3 control information for all component carriers used for uplink and downlink transmissions between a base station and a UE. By way of another example (not shown), it is contemplated that PDSCH 1 604 can include the jointly encoded layer 3 control information for a subset of the component carriers used for uplink and downlink transmissions between the base station and the UE, while at least one disparate PDSCH on at least one differing component carrier can include jointly encoded layer 3 control information for the remainder of the component carriers used for uplink and downlink transmissions between the base station and the UE.

Moreover, a PDCCH 2 606 can be transmitted on component carrier 2 208. PDCCH 2 606 can include separately encoded layer 2 control information corresponding to component carrier 2 208 that indicates an allocation on component carrier 2 208 (CC 2). The allocation on component carrier 2 208 indicated by separately encoded layer 2 control information can be a PDSCH 2 608 sent over component carrier 2 208. For instance, PDSCH 2 608 can include regular UE-specific non-layer 3 signalling traffic.

PDSCH 1 604 can include layer 3 signalling (e.g., layer 3 control information, . . . ) that addresses the plurality of component carriers used for uplink and downlink transmissions between the base station and the UE (or at least more than one of such component carriers from the plurality). While layer 2 control information for component carrier 2 208 can be included in PDCCH 2 606 sent on component carrier 2 208, layer 3 control information for component carrier 2 208 can be included in PDSCH 1 604 sent on component carrier 1 604.

While FIG. 6 depicts PDSCH 1 604 and PDSCH 2 608 being linked to PDCCH 1 602 and PDCCH 2 606, respectively, it is contemplated that either or both of PDCCH 1 602 and PDCCH 2 606 can be linked to a corresponding PUSCH (e.g., PDCCH 1 602 can include separately encoded layer 2 control information that indicates an allocation on a corresponding PUSCH sent over component carrier 1 206, PDCCH 2 606 can include separately encoded layer 2 control information that indicates an allocation on a corresponding PUSCH sent over component carrier 2 208, . . . ). Following this example, a PUSCH (e.g., the PUSCH addressed by PDCCH 1 602 sent upon component carrier 1 206, . . . ) can include jointly encoded layer 3 control information for the plurality of component carriers used for uplink and downlink transmissions between the base station and the UE.

According to various examples described herein, layer 2 control information can be separately encoded rather than jointly encoded. With joint encoding of layer 2 control information, one common PDCCH can include information for component carriers assigned to a UE which is jointly encoded. However, joint encoding of layer 2 control information can result in a Downlink Control Information (DCI) format size that is dynamically changed according to the number of component carriers assigned to the UE or the DCI format size being semi-statically fixed according to the number of component carriers the UE is monitoring. The foregoing can be inefficient, and can result in increased overhead and increased complexity.

Moreover, as described herein, layer 3 control information can be jointly encoded rather than separately encoded. Separate encoding of layer 3 control information can be similar to layer 2 PDCCH control signalling design. For instance, one PDCCH can indicate an allocation on the same component carrier, and the layer 3 control information for this component carrier can be transmitted on the same component carrier (e.g., individual PDCCH with individual layer 3 control signalling, Another approach for separate encoding of layer 3 control information can be that one PDCCH can indicate an allocation on the same or a different component carrier, and the layer 3 control information for this component carrier can be transmitted on the same component carrier (e.g., cross-carrier PDCCH with individual layer 3 control signalling, . . . ).

However, layer 3 control information can be jointly encoded since layer 3 signalling typically is semi-static. For instance, layer 3 control information can be infrequently changed (e.g., on the order of seconds, . . . ). Unlike the PDCCH case where joint encoding can bring concerns over control overhead, PDCCH blind detection, etc., the layer 3 signalling case can be more tolerant to overhead, and can be transparent to PDCCH blind detection as the layer 3 control information is embedded in a PDSCH (or a PUSCH). As a result, layer 3 signalling can accommodate a plurality of component carriers via joint encoding and joint decoding. This can differ from UE-specific non-layer 3 signalling traffic, for which a PDCCH/PDSCH pair (or PDCCH/PUSCH pair) is associated with one component carrier.

For UE-specific non-layer 3 signalling traffic, both PDCCH and PDSCH can be intended for one specific component carrier (e.g., PDCCH 2 606 and PDSCH 2 608 can be intended for component carrier 2 208, . . . ). According to an example (not shown), PDCCH can be sent from an anchor carrier only, and can be intended for the anchor carrier or a different component carrier (e.g., individual PDCCH or cross-carrier PDCCH, . . . ). Moreover, PDSCH can be sent from the component carrier indicated via PDCCH, and can be for that component carrier only. Separate encoding can be employed for non-layer 3 signalling traffic due to concerns over control overhead, PDCCH blind detection, and the like.

In contrast, layer 3 signalling traffic can be jointly encoded. For instance, PDCCH and PDSCH (e.g., PDCCH 1 602 and PDSCH 2 604, . . . ) can be intended for the plurality of component carriers, but can be transmitted in one carrier (e.g., PDCCH and PDSCH can be transmitted from different carriers, but preferably the same carrier, . . . ). According to an example, PDCCH and PDSCH can be transmitted in the anchor carrier assigned to a UE; however, the claimed subject matter is not so limited.

Pursuant to an example, component carrier 1 206 can be an anchor carrier for a UE. Using the anchor carrier UE-specific search space, and if a carrier index is embedded in PDCCH 1 602, the carrier index can indicate the anchor carrier (e.g., component carrier 1 206, . . . ). Moreover, PDSCH 1 604 can be sent from the anchor carrier only, and can carry Radio Resource Control (RRC) signalling (e.g., layer 3 control information, . . . ) for a plurality of component carriers (e.g., all component carriers, . . . ).

According to another example, for a UE to decode layer 3 control information, the layer 3 control information can be included in a PDCCH (e.g., PDCCH 1 602, . . . ) sent upon an anchor carrier (e.g., component carrier 1 206, . . . ). Further, the PDCCH can be linked to a PDSCH (e.g., PDSCH 1 604, . . . ) transmitted upon the anchor carrier. Moreover, the PDSCH can include layer 3 control information for all (or more than one) component carriers. Since the UE monitors one carrier for layer 3 control information (e.g., the anchor carrier, . . . ), a false alarm detection of PDCCHs for layer 3 signalling can be kept the same as in Release 8 (Rel-8), instead of increased with the number of component carriers configured.

In Rel-8, PDCCH Downlink Control Information (DCI) format 1A is often used for the layer 3 reconfigurations, due to its size-efficiency and the resulting reliability. DCI format 1A is typically present for all possible downlink (DL) transmission modes, which can be configured on a per UE basis in a semi-static manner. In LTE-A, when layer 3 signalling is transmitted from the anchor carriers, DCI format 1A can be removed from the non-anchor carriers at least for the purpose of layer 3 signalling. However, there are cases when format 1A may be necessary for other than layer 3 signalling purposes, e.g., for semi-persistent scheduling. For such case, format 1A can be kept at least for a purpose other than layer 3 signalling. Moreover, it can be possible format 1A is removed for some of the transmission modes in the non-anchor carriers (mode-dependent selective removal). Note that the removal of format 1A may not help PDCCH blind detection, depending on how UL DCI formats for LTE-A are to be designed.

Figure 7:
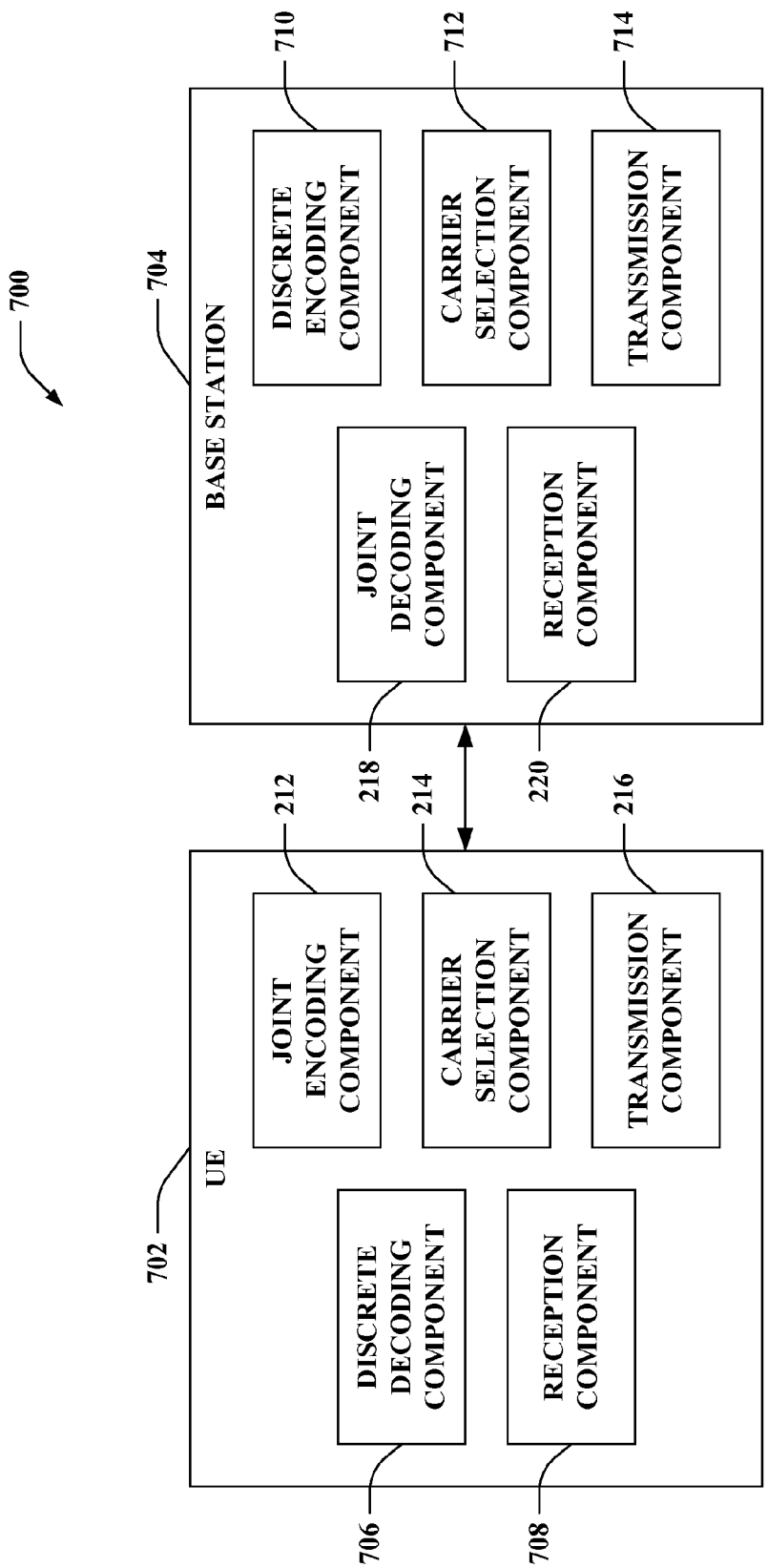
FIG. 7 is an illustration of an example system that jointly encodes layer 3 control information for inclusion in a PUSCH and separately encodes layer 2 control information in a multicarrier wireless communication environment.

Turning to FIG. 7, illustrated is a system 700 that jointly encodes layer 3 control information for inclusion in a PUSCH and separately encodes layer 2 control information in a multicarrier wireless communication environment. System 700 includes a UE 702 (e.g., wireless communication apparatus 1 202 of FIG. 2, UE 304 of FIG. 3, . . . ) and a base station 704 (e.g., wireless communication apparatus 2 204 of FIG. 2, base station 302 of FIG. 3, . . . ). UE 702 and base station 704 can employ a plurality of component carriers (e.g., from the set of component carriers 206-210, . . . ) for uplink and downlink transmissions.

UE 702 can include joint encoding component 212, carrier selection component 214, and transmission component 216. Further, UE 702 can include a discrete decoding component 706, which can be substantially similar to discrete decoding component 308 of FIG. 3, and a reception component, which can be substantially similar to reception component 220. Moreover, base station 704 can include joint decoding component 218 and reception component 220. Base station 704 can also include a discrete encoding component 710 (e.g., which can be substantially similar to discrete encoding component 306 of FIG. 3, . . . ), a carrier selection component 712 (e.g., which can be substantially similar to carrier selection component 214, . . . ), and a transmission component 714 (e.g., which can be substantially similar to transmission component 216, . . . ).

Discrete encoding component 710 can separately encode layer 2 control information for the plurality of component carriers for inclusion in respective PDCCHs. Moreover, carrier selection component 712 can choose respective component carriers upon which the separately encoded layer 2 control information included in the respective PDCCHs can be transmitted to UE 702. Further, transmission component 714 can send the respective PDCCHs, which include the separately encoded layer 2 control information, upon the respective component carriers chosen by carrier selection component 712.

At UE 702, reception component 708 can receive the separate PDCCHs on the respective component carriers. Further, discrete decoding component 706 can evaluate the separate PDCCHs on the respective component carriers to yield layer 2 control information that respectively corresponds to the respective component carriers. For example, one or more of the PDCCHs can include layer 2 control information that schedules one or more respective PUSCHs.

Joint encoding component 212 can jointly encode layer 3 control information (e.g., layer 3 signalling information, ... ) for the plurality of component carriers for inclusion in a PUSCH. Further, carrier selection component 214 can choose a component carrier upon which the PUSCH, which includes the jointly encoded layer 3 control information, can be transmitted. According to an example, carrier selection component 214 of UE 702 can be a slave of carrier selection component 712 of base station 704; following this example, the component carrier chosen for the PUSCH by carrier selection component 214 of UE 702 can be implicitly derived based upon a carrier selection effectuated by carrier selection component 712 of base station 704. By way of another example, UE 702 need not include carrier selection component 214; rather, carrier selection component 712 of base station 704 can choose the component carrier upon which the PUSCH, which includes the jointly encoded layer 3 control information, can be transmitted. Moreover, transmission component 216 can send the PUSCH, which includes the jointly encoded layer 3 control information, upon the component carrier chosen by carrier selection component 214 and/or carrier selection component 712. Joint decoding component 218 can decode the jointly encoded layer 3 control information received by reception component 220. Moreover, at base station 704, joint decoding component 218 can yield layer 3 control information for the plurality of component carriers by decoding the jointly encoded layer 3 control information signaled through the PUSCH obtained by reception component 220 on one component carrier.

Figure 8:
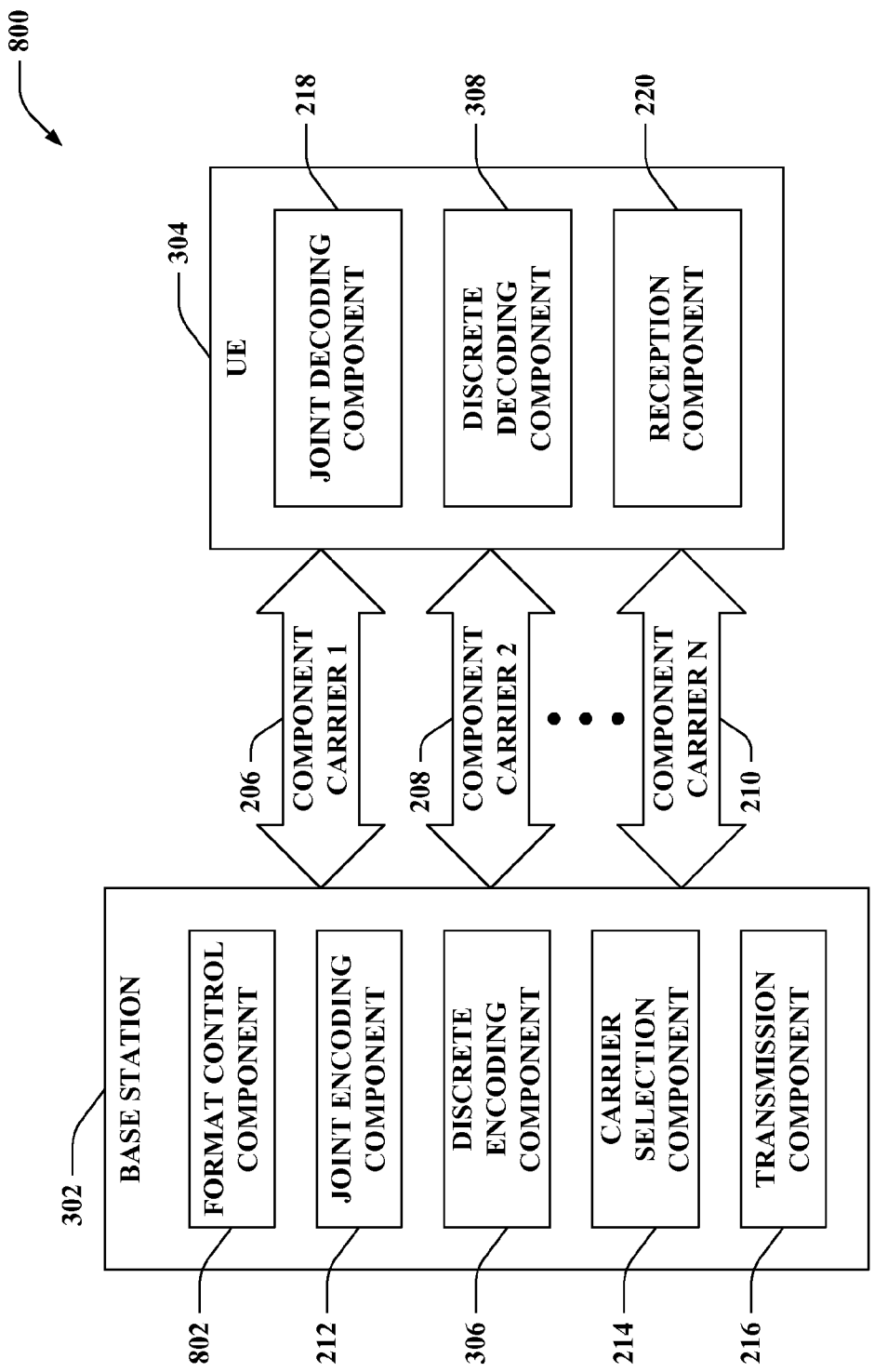
FIG. 8 is an illustration of an example system that sends jointly encoded layer 3 control information over an anchor carrier in a multicarrier wireless communication environment.

Now referring to FIG. 8, illustrated is a system 800 that sends jointly encoded layer 3 control information over an anchor carrier in a multicarrier wireless communication environment. System 800 includes base station 302 (e.g., base station 704 of FIG. 7, ... ) and UE 304 (e.g., UE 702 of FIG. 7, ... ). Base station 302 can include joint encoding component 212, discrete encoding component 306, carrier selection component 214, and transmission component 216. Further, base station 302 can include a format control component 802 that configures PDCCH DCI formats for component carriers in the set of component carriers 206-210. Moreover, UE 304 can include joint decoding component 218, discrete decoding component 308, and reception component 220.

As described herein, discrete encoding component 306 can separately encode layer 2 control information for a plurality of component carriers used for uplink and downlink transmissions between base station 302 and UE 304, and joint encoding component 212 can jointly encode layer 3 control information for the plurality of component carriers. According to an example, carrier selection component 214 can choose an anchor carrier (or anchor carriers) as the component carrier (or component carriers) upon which the jointly encoded layer 3 control information can be sent.

Format control component 802 can use DCI format 1A for a PDCCH sent over an anchor carrier. For instance, the PDCCH sent over the anchor carrier can indicate an allocation on the anchor carrier for a PDSCH that can include the jointly encoded layer 3 control information. Moreover, format control component 802 can inhibit use of DCI format 1A for non-anchor carriers. DCI format 1A need not be used for the non-anchor carriers when the layer 3 control information is not transmitted thereupon since DCI format 1A typically is used for layer 3 reconfigurations. Such removal of DCI format 1A from non-anchor carriers can reduce blind decodes effectuated by UE 304 (e.g., by discrete decoding component 308, ... ) by removing DCI format 1A from a monitored set for the non-anchor carriers.

Although not shown, it is further contemplated that format control component 802 can similarly configure DCI formats for PDCCHs that provide PUSCH allocation information. Format control component 802 can use DCI format 0 for a PDCCH sent over an anchor carrier, where such PDCCH indicates an allocation on the anchor carrier for a PUSCH that can include the jointly encoded layer 3 control information (e.g., jointly encoded layer 3 signalling, jointly encoded acknowledgment flags for the layer 3 signalling, ... ). Further, format control component 802 can inhibit use of DCI format 0 for non-anchor carriers when the layer 3 control information is not transmitted thereupon, which again can reduce blind decodes of PDCCH effectuated by UE 304 (e.g., by discrete decoding component 308, ... ).

UE 304 can monitor both a common search space and a UE-specific search space when attempting to decode a PDCCH in a subframe. For instance, UE 304 can attempt to decode up to six PDCCH candidates in the common search space (e.g., four for control channel element (CCE) aggregation level 4 and two for CCE aggregation level 8, ... ), and up to sixteen PDCCH candidates in the UE-specific search space (e.g., six for CCE aggregation level 1, six for CCE aggregation level 2, two for CCE aggregation level 4, and two for CCE aggregation level 8, ... ). Moreover, UE 304 can be configured via RRC to operate with one of seven transmission modes. Under each transmission mode, UE 304 can conventionally monitor two different PDCCH sizes. As a result, the number of hypotheses detections is: (6+16)*2=44. It is to be noted that UE 304 can be assigned two Radio Network Temporary Identities (RNTIs) (e.g., a cell-RNTI (C-RNTI) and a semi-persistent scheduling RNTI (SPS-RNTI), ... ). The determination of UE-specific search space can e based on one RNTI (e.g., C-RNTI, ... ), and the search space can vary from subframe to subframe.

Thus, according to the aforementioned example, UE 304 can support 44 blind decodes per component carrier. Thus, if UE 304 is configured with five component carriers, then 44*5=220 blind decodes can be supported. Format control component 802 can optimize such blind decoding by allowing UE 304 to monitor one PDCCH size for non-anchor carriers (e.g., DCI format 1A or DCI format 0 can be removed from non-anchor carriers thereby leaving one PDCCH size to be monitored, ... ). Further, the one PDCCH size to be monitored can be mode dependent. Yet, it is to be appreciated that the claimed subject matter is not limited to the foregoing example.

Referring to FIGS. 9-12, methodologies relating to joint encoding and decoding of layer 3 control information for a plurality of component carriers in a multicarrier wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Figure 9:
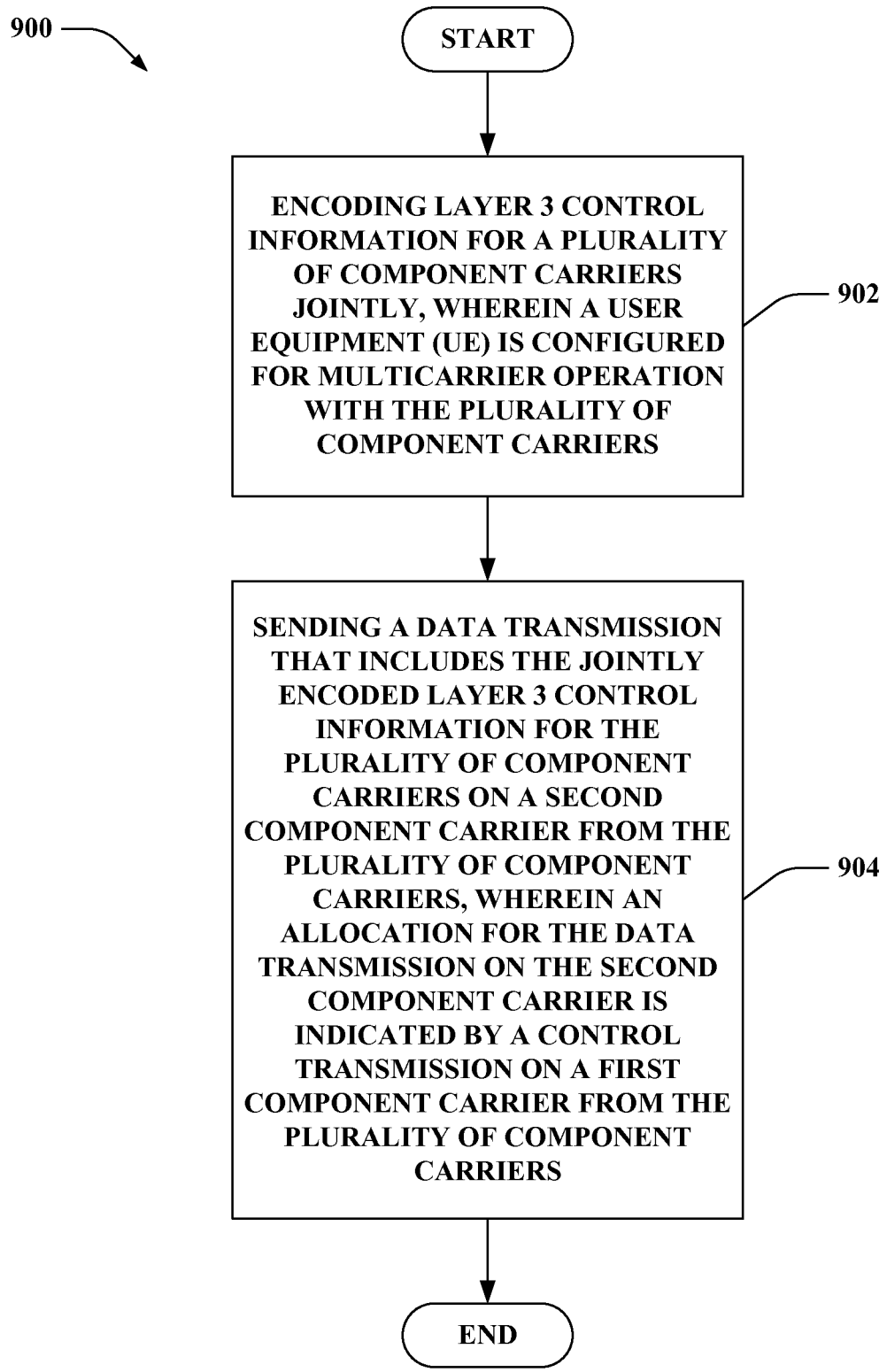
FIG. 9 is an illustration of an example methodology that facilitates signalling information (e.g., layer 3 control information, . . . ) in a multicarrier wireless communication environment.

With reference to FIG. 9, illustrated is a methodology 900 that facilitates signalling information (e.g., layer 3 control information, . . . ) in a multicarrier wireless communication environment. At 902, layer 3 control information for a plurality of component carriers can be jointly encoded. Further, a user equipment (UE) can be configured for multicarrier operation with the plurality of component carriers. At 904, a data transmission that includes the jointly encoded layer 3 control information for the plurality of component carriers can be sent on a second component carrier from the plurality of component carriers. Moreover, an allocation for the data transmission on the second component carrier can be indicated by a control transmission on a first component carrier from the plurality of component carriers. The control transmission, for instance, can be a Physical Downlink Control Channel (PDCCH). According to an example, the data transmission can be sent by a base station to the UE; following this example, the data transmission can be a Physical Downlink Shared Channel (PDSCH). By way of another example, the data transmission can be sent by the UE to the base station; pursuant to this example, the data transmission can be a Physical Uplink Shared Channel (PUSCH). Further, the first component carrier and the second component carrier can be the same component carrier or different component carriers.

Figure 10:
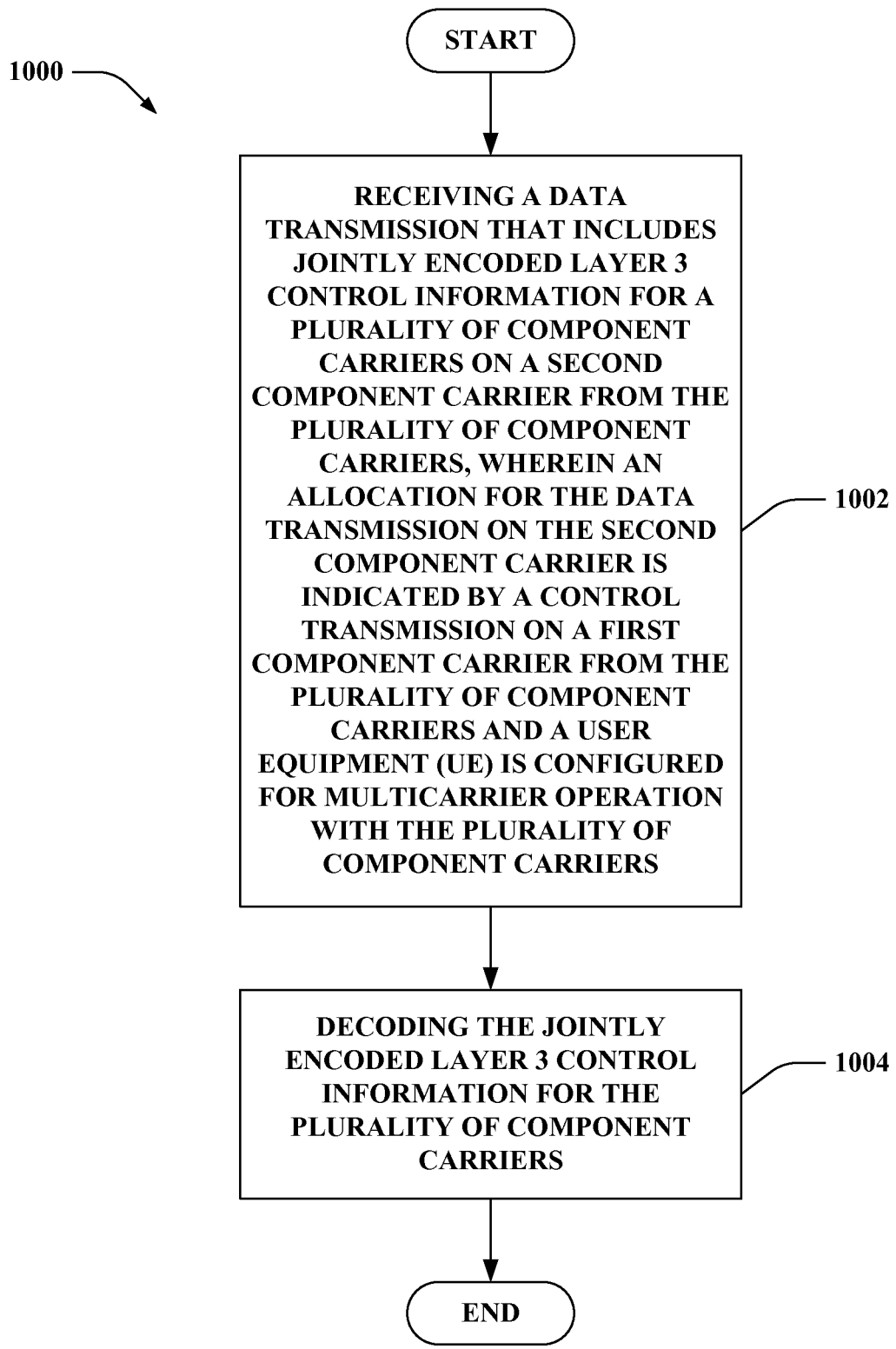
FIG. 10 is an illustration of an example methodology that facilitates evaluating received information (e.g., layer 3 control information, . . . ) in a multicarrier wireless communication environment.

Now referring to FIG. 10, illustrated is a methodology 1000 that facilitates evaluating received information (e.g., layer 3 control information, . . . ) in a multicarrier wireless communication environment. At 1002, a data transmission that includes jointly encoded layer 3 control information for a plurality of component carriers can be received on a second component carrier from the plurality of component carriers. For instance, an allocation for the data transmission on the second component carrier can be indicated by a control transmission on a first component carrier from the plurality of component carriers. Moreover, the control transmission can be a Physical Downlink Control Channel (PDCCH). Further, a user equipment (UE) can be configured for multicarrier operation with the plurality of component carriers. According to an example, the data transmission can be received by the UE from a base station; thus, the data transmission can be a Physical Downlink Shared Channel (PDSCH). In accordance with another example, the data transmission can be received by the base station from the UE; hence, the data transmission can be a Physical Uplink Shared Channel (PUSCH). Further, the first component carrier and the second component carrier can be the same component carrier or different component carriers. At 1004, the jointly encoded layer 3 control information for the plurality of component carriers can be decoded.

Figure 11:
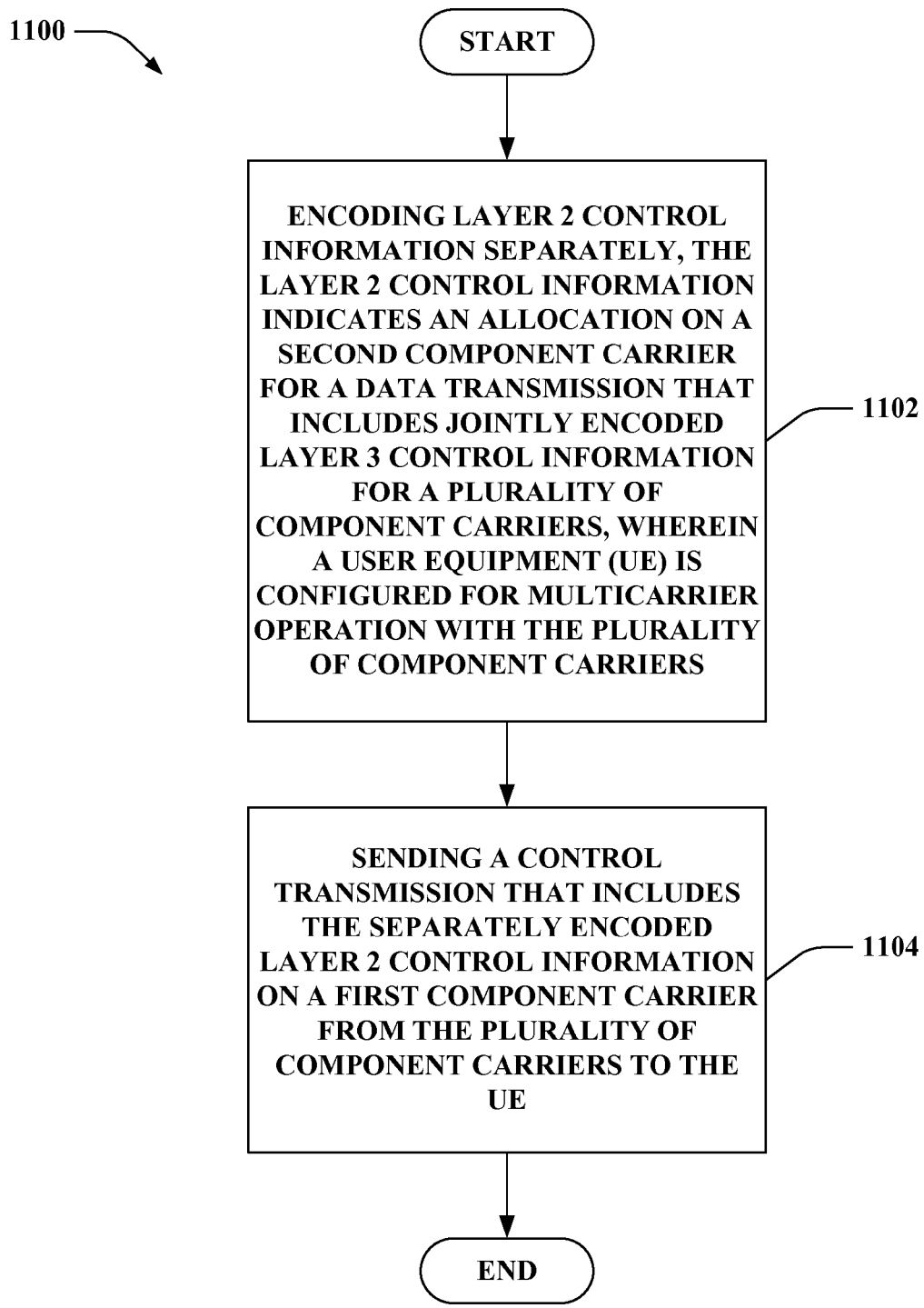
FIG. 11 is an illustration of an example methodology that facilitates encoding layer 2 control information in a multicarrier wireless communication environment.

Turning to FIG. 11, illustrated is a methodology 1100 that facilitates encoding layer 2 control information in a multicarrier wireless communication environment. At 1102, layer 2 control information can be encoded separately. The layer 2 control information can indicate an allocation on a second component carrier for a data transmission that includes jointly encoded layer 3 control information for a plurality of component carriers. Moreover, a user equipment (UE) can be configured for multicarrier operation with the plurality of component carriers. According to an example, the data transmission can be a Physical Downlink Shared Channel (PDSCH) or a Physical Uplink Shared Channel (PUSCH). At 1104, a control transmission that includes the separately encoded layer 2 control information can be sent on a first component carrier from the plurality of component carriers to the UE. For instance, the control transmission can be a Physical Downlink Control Channel (PDCCH). Further, the first component carrier and the second component carrier can be the same component carrier or different component carriers. According to an example, methodology 1100 can be effectuated in combination with methodology 900 of FIG. 9. By way of another example, methodology 1100 can be effectuated in combination with methodology 1000 of FIG. 10.

Figure 12:
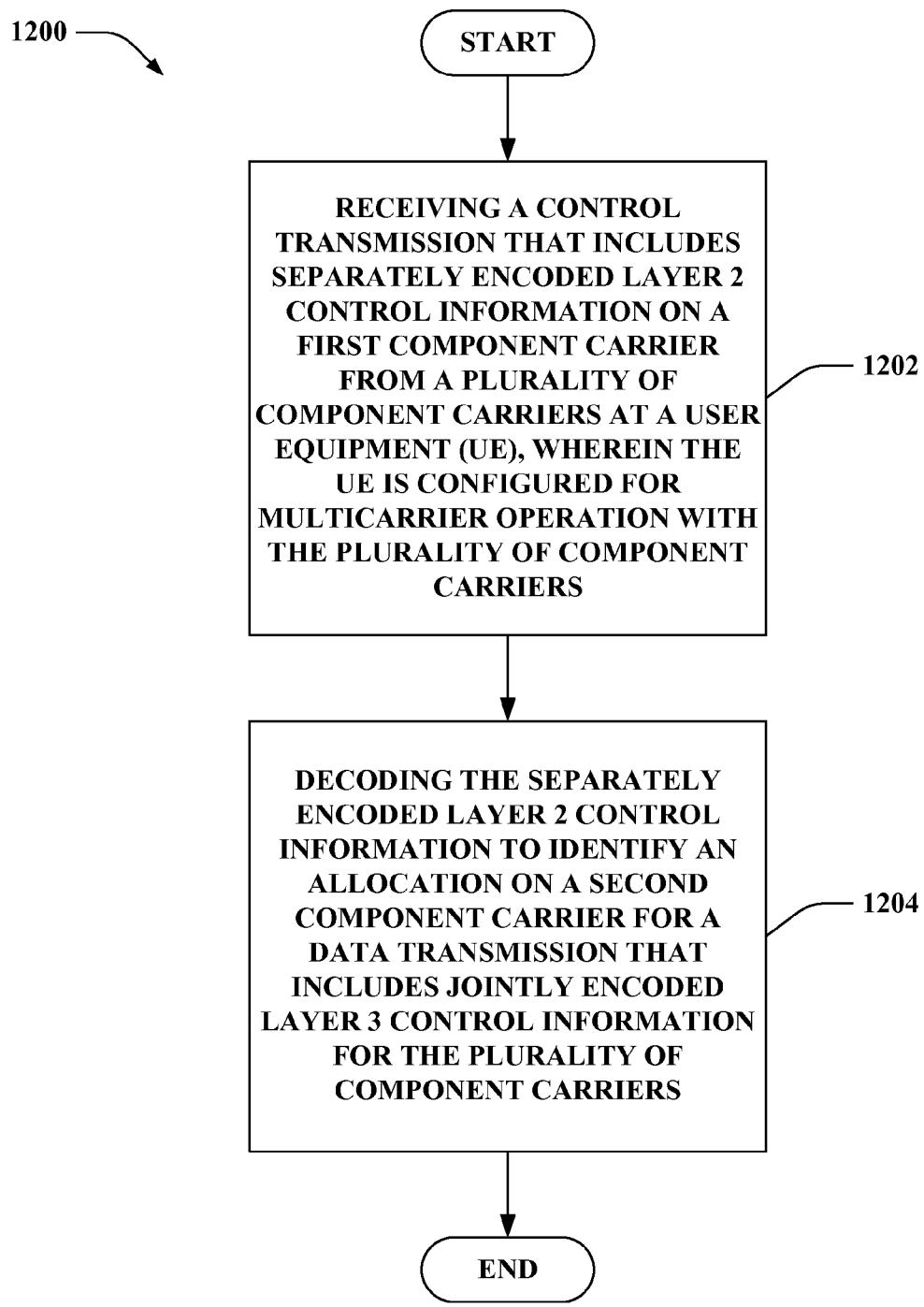
FIG. 12 is an illustration of an example methodology that facilitates decoding layer 2 control information in a multicarrier wireless communication environment.

Now referring to FIG. 12, illustrated is a methodology 1200 that facilitates decoding layer 2 control information in a multicarrier wireless communication environment. At 1202, a control transmission that includes separately encoded layer 2 control information on a first component carrier from a plurality of component carriers can be received at a user equipment (UE). For instance, the UE can be configured for multicarrier operation with the plurality of component carriers. The control transmission, for example, can be a Physical Downlink Control Channel (PDCCH). At 1204, the separately encoded layer 2 control information can be decoded to identify an allocation on a second component carrier for a data transmission that includes jointly encoded layer 3 control information for the plurality of component carriers. For example, the data transmission can be a Physical Downlink Shared Channel (PDSCH) or a Physical Uplink Shared Channel (PUSCH). Further, the first component carrier and the second component carrier can be the same component carrier or different component carriers. According to an example, methodology 1200 can be effectuated in conjunction with methodology 900 of FIG. 9. By way of another example, methodology 1200 can be effectuated in conjunction with methodology 1000 of FIG. 10

Moreover, the below noted examples can apply to methodologies 900, 1000, 1100, and 1200 from FIGS. 9-12. According to an example, the first component carrier can be the second component carrier when same carrier signalling is implemented. By way of another example, the first component carrier can be the second component carrier or the first component carrier can differ from the second component carrier when cross-carrier signalling is implemented. Following this example, the control transmission sent or received on the first component carrier can include an indicator that signifies the second component carrier for the data transmission.

Other examples can also relate to methodologies 900, 1000, 1100, and 1200 from FIGS. 9-12. Pursuant to an example, the first component carrier and the second component carrier can be an anchor carrier designated for the UE. The anchor carrier can be configured on a semi-static basis. Following this example, the control transmission (e.g., PDCCH, . . . ) and the data transmission (e.g., PDSCH, PUSCH, . . . ) that includes the jointly encoded layer 3 control information, where the data transmission is scheduled by the control transmission, can be sent or received on the anchor carrier. Further, Downlink Control Information (DCI) format 1A can be used for the control transmission (e.g., PDCCH, . . . ) sent or received over the anchor carrier when the data transmission that includes the jointly encoded layer 3 control information is a PDSCH. Moreover, use of DCI format 1A for a disparate control transmission (e.g., a disparate PDCCH, . . . ) sent or received on a non-anchor carrier can be inhibited when the disparate control transmission includes disparate separately encoded layer 2 control information that indicates a disparate allocation for a disparate PDSCH that includes UE-specific non-layer 3 signalling traffic. According to another example, DCI format 0 can be used for the control transmission (e.g., PDCCH, . . . ) sent or received over the anchor carrier when the data transmission that includes the jointly encoded layer 3 control information is a PUSCH. Moreover, use of DCI format 0 for a disparate control transmission (e.g., a disparate PDCCH, . . . ) sent or received on a non-anchor carrier can be inhibited when the disparate control transmission includes disparate separately encoded layer 2 control information that indicates a disparate allocation for a disparate PUSCH that includes UE-specific non-layer 3 signalling traffic.

It will be appreciated that, in accordance with one or more aspects described herein, inferences can be made pertaining to jointly encoding layer 3 control information in a multicarrier wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 13:
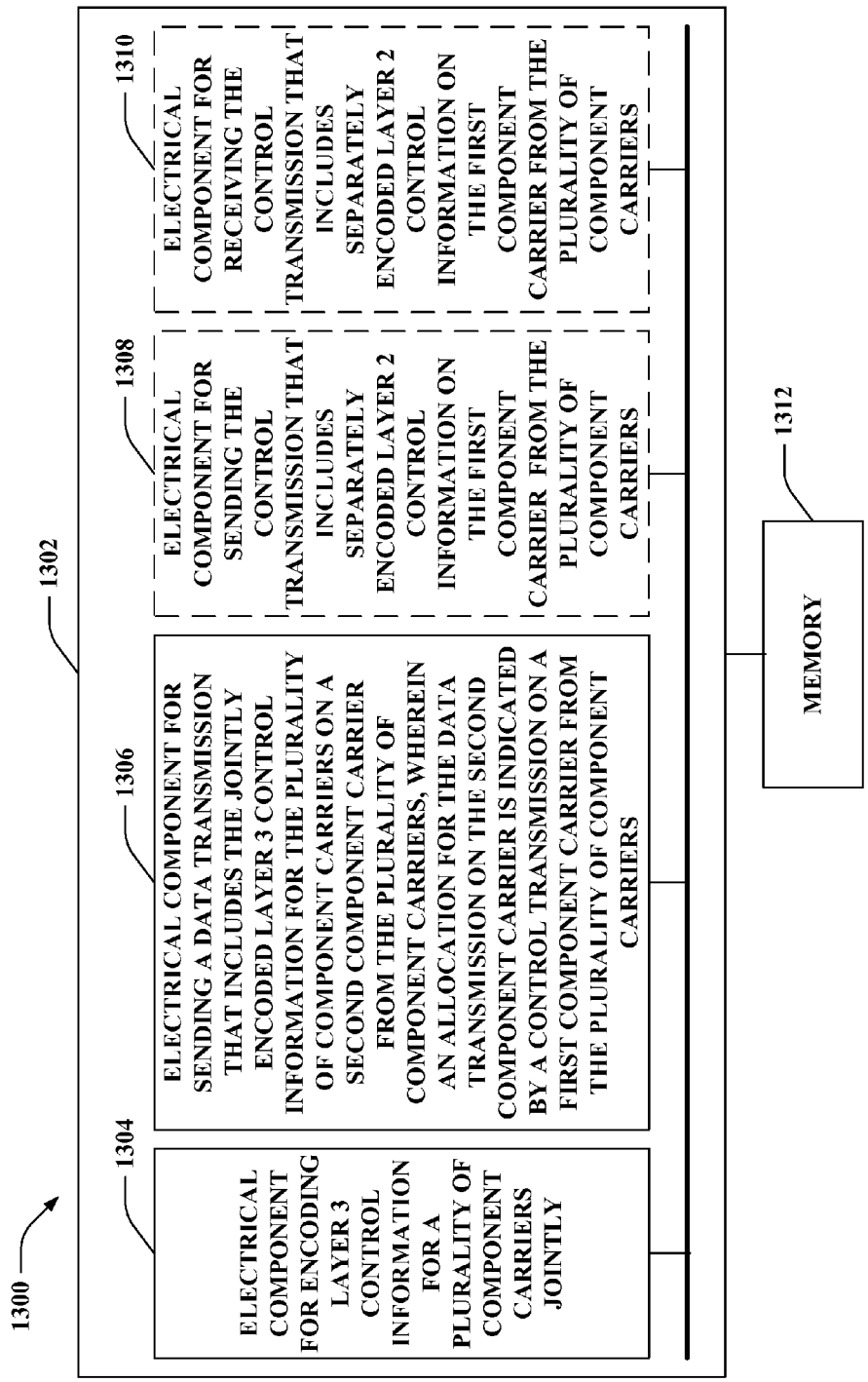
FIG. 13 is an illustration of an example system that enables encoding layer 3 control information in a multicarrier wireless communication environment.

With reference to FIG. 13, illustrated is a system 1300 that enables encoding layer 3 control information in a multicarrier wireless communication environment. For example, system 1300 can reside at least partially within a base station. According to another example, system 1300 can reside within a UE. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for encoding layer 3 control information for a plurality of component carriers jointly 1304. Further, logical grouping 1302 can include an electrical component for sending a data transmission that includes the jointly encoded layer 3 control information for the plurality of component carriers on a second component carrier from the plurality of component carriers 1306. For instance, an allocation for the data transmission on the second component carrier can be indicated by a control transmission on a first component carrier from the plurality of component carriers. Logical grouping 1302 can also optionally include an electrical component for sending the control transmission that includes separately encoded layer 2 control information on the first component carrier from the plurality of component carriers 1308. Although not shown, it is contemplated that logical grouping 1302 can also optionally include an electrical component for encoding the layer 2 control information separately. Moreover, logical grouping 1302 can optionally include an electrical component for receiving the control transmission that includes separately encoded layer 2 control information on the first component carrier from the plurality of component carriers 1310. Although not depicted, it is to be appreciated that logical grouping 1302 can also optionally include an electrical component for decoding the separately encoded layer 2 control information to identify the allocation on the second component carrier for the data transmission. Additionally, system 1300 can include a memory 1312 that retains instructions for executing functions associated with electrical components 1304, 1306, 1308, and 1310. While shown as being external to memory 1312, it is to be understood that one or more of electrical components 1304, 1306, 1308, and 1310 can exist within memory 1312.

Figure 14:
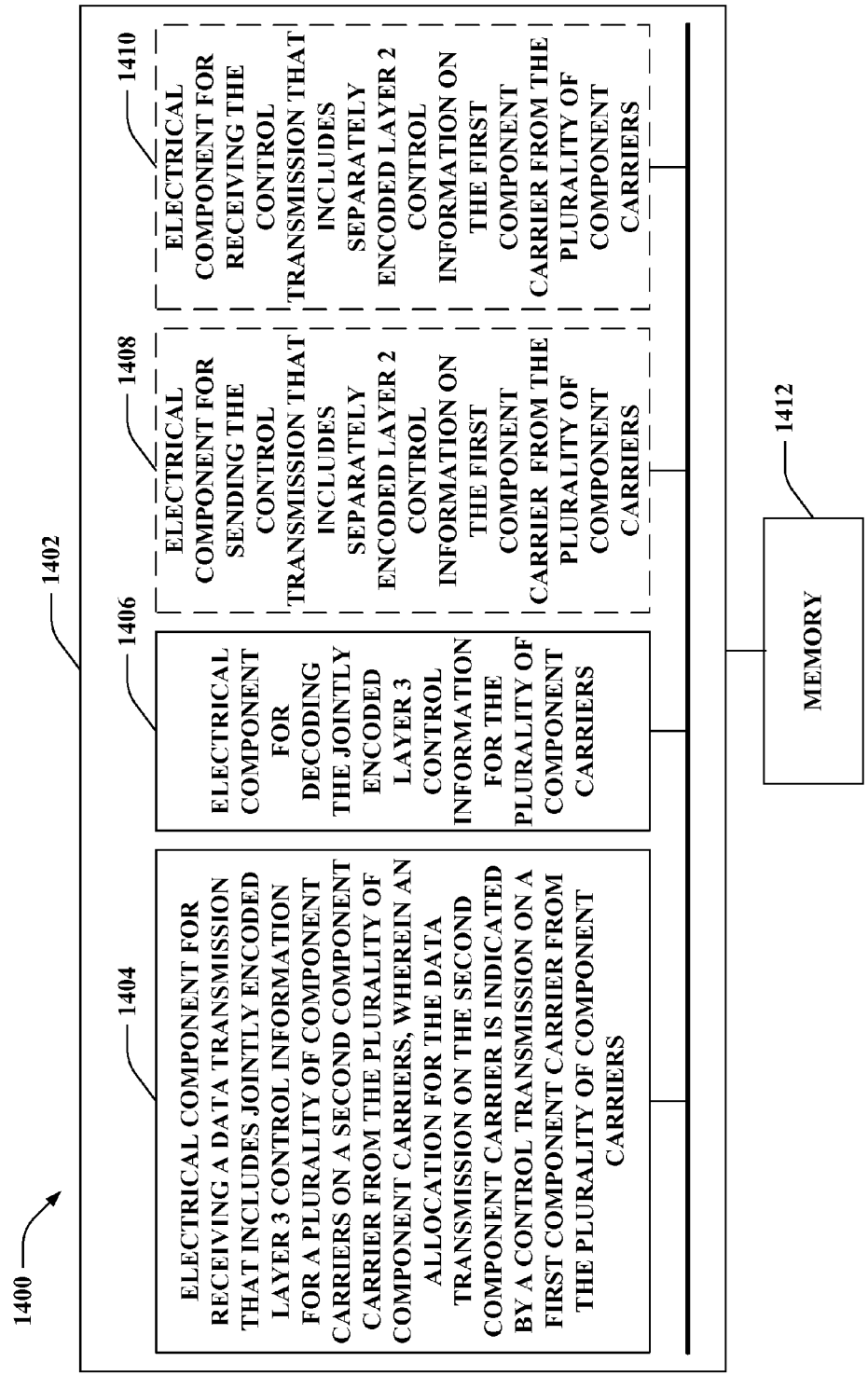
FIG. 14 is an illustration of an example system that enables decoding layer 3 control information in a multicarrier wireless communication environment.

With reference to FIG. 14, illustrated is a system 1400 that enables decoding layer 3 control information in a multicarrier wireless communication environment. For example, system 1400 can reside at least partially within a base station. According to another example, system 1400 can reside within a UE. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for receiving a data transmission that includes jointly encoded layer 3 control information for a plurality of component carriers on a second component carrier from the plurality of component carriers 1404. For example, an allocation for the data transmission on the second component carrier can be indicated by a control transmission on a first component carrier from the plurality of component carriers. Further, logical grouping 1402 can include an electrical component for decoding the jointly encoded layer 3 control information for the plurality of component carriers 1406. Logical grouping 1402 can also optionally include an electrical component for sending the control transmission that includes separately encoded layer 2 control information on the first component carrier from the plurality of component carriers 1408. Although not shown, it is contemplated that logical grouping 1402 can also optionally include an electrical component for encoding the layer 2 control information separately. Moreover, logical grouping 1402 can optionally include an electrical component for receiving the control transmission that includes separately encoded layer 2 control information on the first component carrier from the plurality of component carriers 1410. Although not depicted, it is to be appreciated that logical grouping 1402 can also optionally include an electrical component for decoding the separately encoded layer 2 control information to identify the allocation on the second component carrier for the data transmission. Additionally, system 1400 can include a memory 1412 that retains instructions for executing functions associated with electrical components 1404, 1406, 1408, and 1410. While shown as being external to memory 1412, it is to be understood that one or more of electrical components 1404, 1406, 1408, and 1410 can exist within memory 1412.

Figure 15:
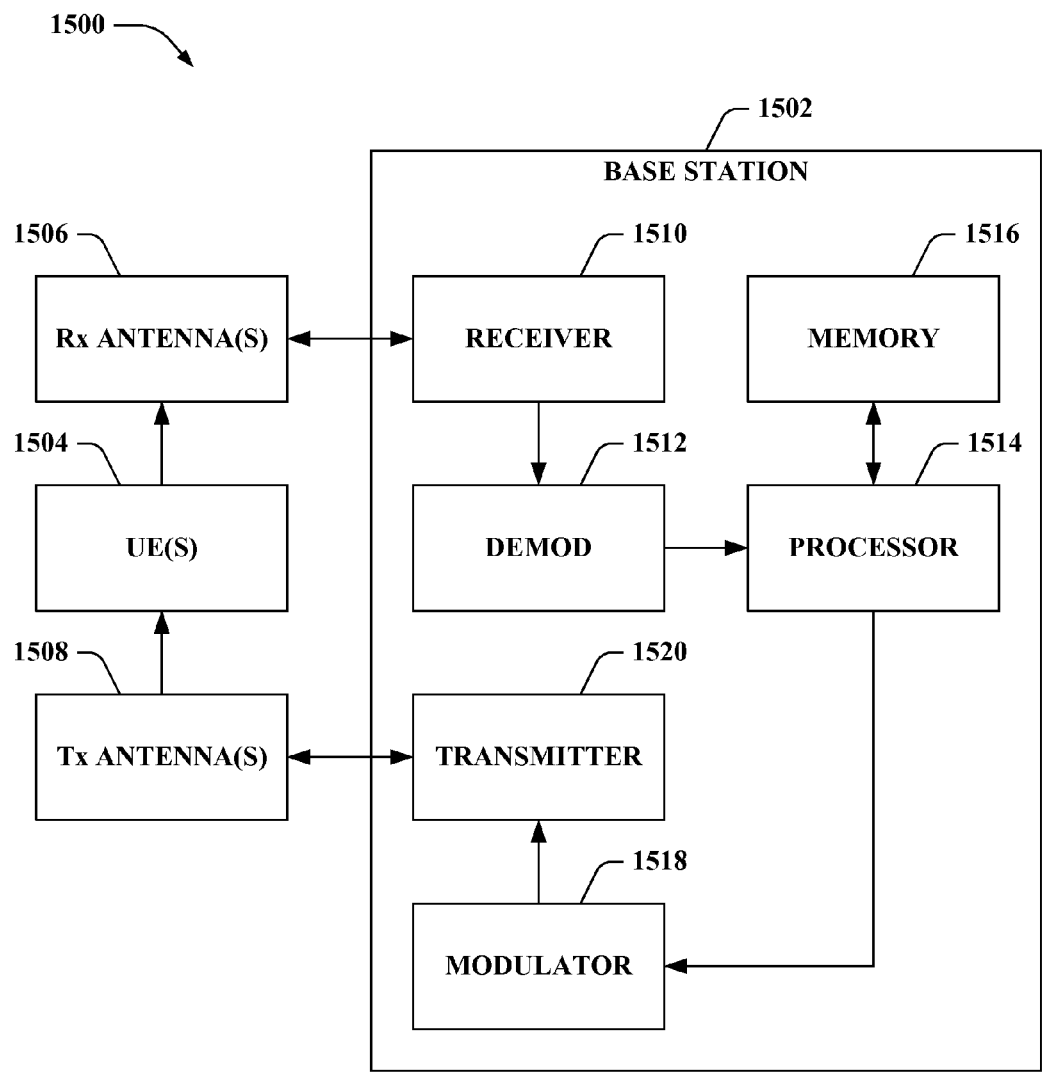
FIGS. 15-16 are illustrations of example systems that can be utilized to implement various aspects of the functionality described herein.

FIG. 15 is an illustration of a system 1500 that can be utilized to implement various aspects of the functionality described herein. System 1500 can include a base station 1502 (e.g., base station 302, base station 704, . . . ). Base station 1502 can receive signal(s) from one or more UEs 1504 via one or more receive (Rx) antennas 1506 and transmit to the one or more UEs 1504 via one or more transmit (Tx) antennas 1508. Further, base station 1502 can include a receiver 1510 that receives information from receive antenna(s) 1506. According to an example, receiver 1510 can be operatively associated with a demodulator (demod) 1512 that demodulates received information. Demodulated symbols can be analyzed by a processor 1514. Processor 1514 can be coupled to memory 1516, which can store data to be transmitted to or received from UE(s) 1504 and/or any other suitable protocols, algorithms, information, etc. related to performing the various actions and functions set forth herein. For example, base station 1502 can employ processor 1514 to perform methodologies 900, 1000, 1100, and/or other similar and appropriate methodologies. Base station 1502 can further include a modulator 1518 that can multiplex a signal for transmission by a transmitter 1520 through antenna(s) 1508.

Processor 1514 can be a processor dedicated to analyzing information received by receiver 1510, dedicated to generating information for transmission by transmitter 1520, or dedicated to controlling one or more components of base station 1502. According to another example, processor 1514 can analyze information received by receiver 1510, generate information for transmission by transmitter 1520, and control one or more components of base station 1502. The one or more components of base station 1502 can include, for example, joint encoding component 212, carrier selection component 214 (e.g., carrier selection component 712, . . . ), transmission component 216 (e.g., transmission component 714, . . . ), discrete encoding component 306 (e.g., discrete encoding component 710, . . . ), joint decoding component 218, reception component 220, and/or format control component 802. Moreover, although not shown, it is contemplated that the one or more components of base station 1502 can be part of processor 1514 or a plurality of processors (not shown).

Figure 16:
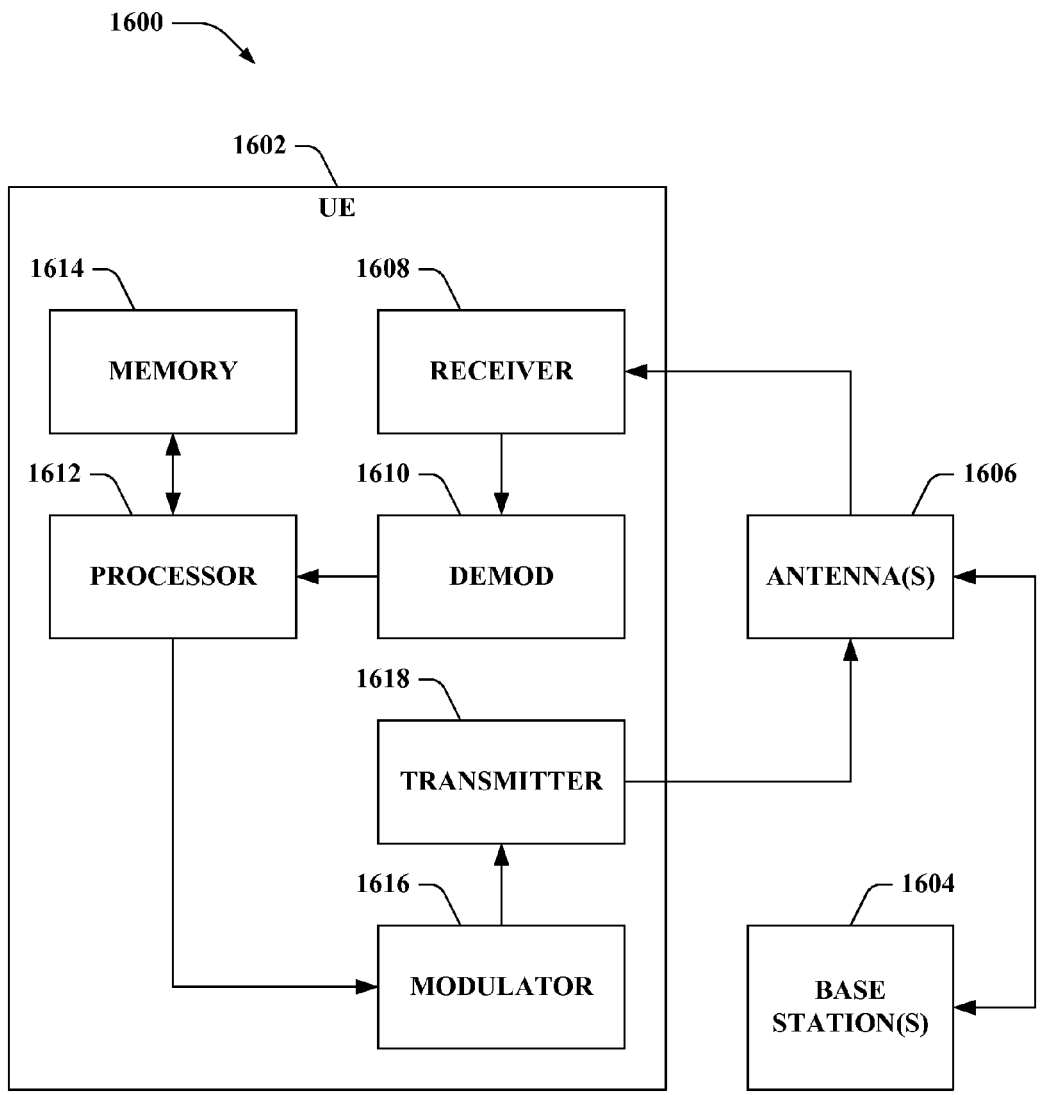

FIG. 16 is an illustration of a system 1600 that can be utilized to implement various aspects of the functionality described herein. System 1600 can include a UE 1602 (e.g., UE 304, UE 702, . . . ). UE 1602 can receive signal(s) from one or more base stations 1604 and/or transmit to one or more base stations 1604 via one or more antennas 1606. Further, UE 1602 can include a receiver 1608 that receives information from antenna(s) 1606. According to an example, receiver 1608 can be operatively associated with a demodulator (demod) 1610 that demodulates received information. Demodulated symbols can be analyzed by a processor 1612. Processor 1612 can be coupled to memory 1614, which can store data to be transmitted to or received from base station(s) 1604 and/or any other suitable protocols, algorithms, information, etc. related to performing the various actions and functions set forth herein. For example, UE 1602 can employ processor 1612 to perform methodologies 900, 1000, 1200, and/or other similar and appropriate methodologies. UE 1602 can further include a modulator 1616 that can multiplex a signal for transmission by a transmitter 1618 through antenna(s) 1606.

Processor 1612 can be a processor dedicated to analyzing information received by receiver 1608, dedicated to generating information for transmission by transmitter 1618, or dedicated to controlling one or more components of UE 1602. According to another example, processor 1612 can analyze information received by receiver 1608, generate information for transmission by transmitter 1618, and control one or more components of UE 1602. The one or more components of UE 1602 can include, for example, joint decoding component 218, reception component 220 (e.g., reception component 708, . . . ), discrete decoding component 308 (e.g., discrete decoding component 706, . . . ), joint encoding component 212, carrier selection component 214, and/or transmission component 216. Moreover, although not shown, it is contemplated that the one or more components of UE 1602 can be part of processor 1612 or a plurality of processors (not shown).

Figure 17:
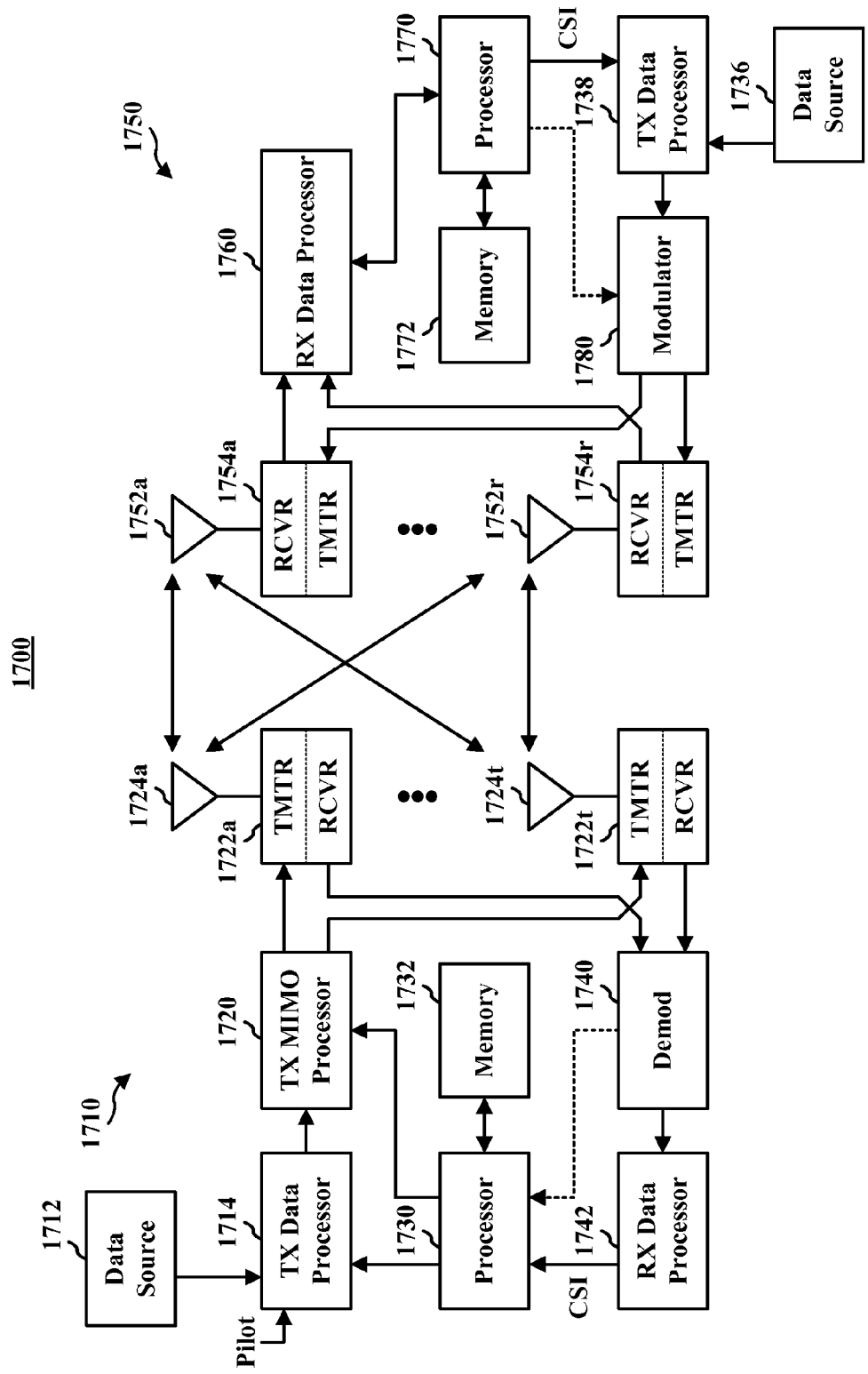
FIG. 17 is an illustration of an example wireless communication system that can be employed in conjunction with the various systems and methods described herein.

FIG. 17 shows an example wireless communication system 1700. Wireless communication system 1700 depicts one base station 1710 and one UE 1750 for sake of brevity. However, it is to be appreciated that system 1700 can include more than one base station and/or more than one UE, wherein additional base stations and/or UEs can be substantially similar or different from example base station 1710 and UE 1750 described below. In addition, it is to be appreciated that base station 1710 and/or UE 1750 can employ the systems (FIGS. 1-3, 7-8 and 13-16) and/or methods (FIGS. 9-12) described herein to facilitate wireless communication there between.

At base station 1710, traffic data for a number of data streams is provided from a data source 1712 to a transmit (TX) data processor 1714. According to an example, each data stream can be transmitted over a respective antenna. TX data processor 1714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at UE 1750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1730.

The modulation symbols for the data streams can be provided to a TX MIMO processor 1720, which can further process the modulation symbols (e.g., for OFDM). TX MIMO processor 1720 then provides $N_T$ modulation symbol streams to $N_T$ transmitters (TMTR) 1722a through 1722t. In various embodiments, TX MIMO processor 1720 applies beamforming weights to the symbols of the data streams and to the antenna from which the symbol is being transmitted.

Each transmitter 1722 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1722a through 1722t are transmitted from $N_T$ antennas 1724a through 1724t, respectively.

At UE 1750, the transmitted modulated signals are received by $N_R$ antennas 1752a through 1752r and the received signal from each antenna 1752 is provided to a respective receiver (RCVR) 1754a through 1754r. Each receiver 1754 conditions (e.g., filters, amplifies, and downconverts) a respective signal, digitizes the conditioned signal to provide samples, and further processes the samples to provide a corresponding "received" symbol stream.

An RX data processor 1760 can receive and process the $N_R$ received symbol streams from $N_R$ receivers 1754 based on a particular receiver processing technique to provide $N_T$ "detected" symbol streams. RX data processor 1760 can demodulate, deinterleave, and decode each detected symbol stream to recover the traffic data for the data stream. The processing by RX data processor 1760 is complementary to that performed by TX MIMO processor 1720 and TX data processor 1714 at base station 1710.

A processor 1770 can periodically determine which available technology to utilize as discussed above. Further, processor 1770 can formulate a reverse link message comprising a matrix index portion and a rank value portion.

The reverse link message can comprise various types of information regarding the communication link and/or the received data stream. The reverse link message can be processed by a TX data processor 1738, which also receives traffic data for a number of data streams from a data source 1736, modulated by a modulator 1780, conditioned by transmitters 1754a through 1754r, and transmitted back to base station 1710.

At base station 1710, the modulated signals from UE 1750 are received by antennas 1724, conditioned by receivers 1722, demodulated by a demodulator 1740, and processed by a RX data processor 1742 to extract the reverse link message transmitted by UE 1750. Further, processor 1730 can process the extracted message to determine which precoding matrix to use for determining the beamforming weights.

Processors 1730 and 1770 can direct (e.g., control, coordinate, manage, etc.) operation at base station 1710 and UE 1750, respectively. Respective processors 1730 and 1770 can be associated with memory 1732 and 1772 that store program codes and data. Processors 1730 and 1770 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates signaling information in a multicarrier wireless communication environment, comprising:
    encoding layer 3 control information for a plurality of component carriers jointly, wherein a user equipment (UE) is configured for multicarrier operation with the plurality of component carriers;
    sending a data transmission that includes the jointly encoded layer 3 control information for the plurality of component carriers on a second component carrier from the plurality of component carriers, wherein an allocation for the data transmission on the second component carrier is indicated by a control transmission on a first component carrier from the plurality of component carriers, wherein the first component carrier and the second component carrier are an anchor carrier designated for the UE;
    sending the control transmission and the data transmission that includes the jointly encoded layer 3 control information on the anchor carrier, wherein the data transmission is scheduled by the control transmission;
    using Downlink Control Information (DCI) format IA for the control transmission sent on the anchor carrier when the data transmission that includes the jointly encoded layer 3 control information is a Physical Downlink Shared Channel (PDSCH); and
    inhibiting use of the DCI format IA for a disparate control transmission sent on a non-anchor carrier when the disparate control transmission includes disparate separately encoded layer 2 control information that indicates a disparate allocation for a disparate PDSCH that includes UE-specific non-layer 3 signaling traffic.

2. The method of claim 1, wherein the control transmission is a Physical Downlink Control Channel (PDCCH).

3. The method of claim 1, further comprising sending the data transmission from a base station to the UE, wherein the data transmission is a Physical Downlink Shared Channel (PDSCH).

4. The method of claim 1, further comprising sending the data transmission from the UE to a base station, wherein the data transmission is a Physical Uplink Shared Channel (PUSCH).

5. The method of claim 1, further comprising:
    encoding layer 2 control information separately, the layer 2 control information indicates the allocation on the second component carrier for the data transmission that includes the jointly encoded layer 3 control information for the plurality of component carriers: and
    sending the control transmission that includes the separately encoded layer 2 control information on the first component carrier from the plurality of component carriers to the UE.

6. The method of claim 1, further comprising:
    receiving the control transmission that includes separately encoded layer 2 control information on the first component carrier from the plurality of component carriers at the UE; and
    decoding the separately encoded layer 2 control information to identify the allocation on the second component carrier for the data transmission that includes the jointly encoded layer 3 control information for the plurality of component carriers.

7. The method of claim 1, wherein the first component carrier is the second component carrier when same carrier signalling is implemented.

8. The method of claim 1, wherein one of the first component carrier is the second component carrier or the first component carrier differs from the second component carrier when cross-carrier signalling is implemented.

9. The method of claim 1, wherein the anchor carrier is configured on a semi-static basis.

10. A wireless communications apparatus, comprising;
a memory that retains instructions related to encoding layer 3 control information for a plurality of component carriers jointly, and sending a data transmission that includes the jointly encoded layer 3 control information for the plurality of component carriers on a second component carrier from the plurality of component carriers, wherein an allocation for the data transmission on the second component carrier is indicated by a control transmission on a first component carrier from the plurality of component carriers and a user equipment (UE) is configured for multicarrier operation with the plurality of component carriers, wherein the first component carrier and the second component carrier are an anchor carrier designated for the UE, sending the control transmission and the data transmission that includes the jointly encoded layer 3 control information on the anchor carrier, wherein the data transmission is scheduled by the control transmission, using Downlink Control Information (DCI) format 1A for the control transmission sent on the anchor carrier when the data transmission that includes the jointly encoded layer 3 control information is a Physical Downlink Shared Channel (PDSCH), and inhibiting use of the DCI format 1A for a disparate control transmission sent on a non-anchor carrier when the disparate control transmission includes disparate separately encoded layer 2 control information that indicates a disparate allocation for a disparate PDSCH that includes UE-specific non-layer 3 signaling traffic; and
a processor, coupled to the memory, configured to execute the instructions retained in the memory.

11. The wireless communications apparatus of claim 10, wherein the control transmission is a Physical Downlink Control Channel (PDCCH) and the data transmission is a Physical Downlink Shared Channel (PDSCH).

12. The wireless communications apparatus of claim 10, wherein the control transmission is a Physical Downlink Control Channel (PDCCH) and the data transmission is a Physical Uplink Shared Channel (PUSCH).

13. The wireless communications apparatus of claim 10, wherein the memory further retains instructions related to encoding layer 2 control information separately, the layer 2 control information indicates the allocation on the second component carrier for the data transmission that includes the jointly encoded layer 3 control information for the plurality of component carriers, and sending the control transmission that includes the separately encoded layer 2 control information on the first component carrier from the plurality of component carriers to the UE.

14. The wireless communications apparatus of claim 10, wherein the memory further retains instructions related to receiving the control transmission that includes separately encoded layer 2 control information on the first component carrier from the plurality of component carriers at the UE, and decoding the separately encoded layer 2 control information to identify the allocation on the second component carrier for the data transmission that includes the jointly encoded layer 3 control information for the plurality of component carriers.

15. The wireless communications apparatus of claim 10, wherein the first component carrier is the second component carrier when same carrier signalling is implemented.

16. The wireless communications apparatus of claim 10, wherein one of the first component carrier is the second component carrier or the first component carrier differs from the second component carrier when cross-carrier signalling is implemented.

17. The wireless communications apparatus of claim 10, wherein the anchor carrier is configured on a semi-static basis.

18. A wireless communications apparatus that enables encoding information in a multicarrier wireless communication environment, comprising:
means for encoding layer 3 control information for a plurality of component carriers jointly, wherein a user equipment (UE) is configured for multicarrier operation with the plurality of component carriers;
means for sending a data transmission that includes the jointly encoded layer 3 control information for the plurality of component carriers on a second component carrier from the plurality of component carriers, wherein an allocation for the data transmission on the second component carrier is indicated by a control transmission on a first component carrier from the plurality of component carriers, wherein the first component carrier and the second component carrier are an anchor carrier designated for the UE;
means for sending the control transmission and the data transmission that includes the jointly encoded layer 3 control information on the anchor carrier, wherein the data transmission is scheduled by the control transmission;
means for using Downlink Control Information (DCI) format IA for the control transmission sent on the anchor carrier when the data transmission that includes the jointly encoded layer 3 control information is a Physical Downlink Shared Channel (PDSCH); and
means for inhibiting use of the DCI format IA for a disparate control transmission sent on a non-anchor carrier when the disparate control transmission includes disparate separately encoded layer 2 control information that indicates a disparate allocation for a disparate PDSCH that includes UE-specific non-layer 3 signaling traffic.

19. The wireless communications apparatus of claim 18, further comprising means for sending the control transmission that includes separately encoded layer 2 control information on the first component carrier from the plurality of component carriers.

20. The wireless communications apparatus of claim 19, wherein the control transmission is a Physical Downlink Control Channel (PDCCH) and the data transmission is a Physical Downlink Shared Channel (PDSCH).

21. The wireless communications apparatus of claim 18, further comprising means for receiving the control transmission that includes separately encoded layer 2 control information on the first component carrier from the plurality of component carriers.

22. The wireless communications apparatus of claim 21, wherein the control transmission is a Physical Downlink Control Channel (PDCCH) and the data transmission is a Physical Uplink Shared Channel (PUSCH).

23. A computer program product, comprising:
a non-transitory computer-readable medium comprising:
code for encoding layer 3 control information for a plurality of component carriers jointly, wherein a user equipment (UE) is configured for multicarrier operation with the plurality of component carriers;
code for sending a data transmission that includes the jointly encoded layer 3 control information for the plurality of component carriers on a second component carrier from the plurality of component carriers, wherein an allocation for the data transmission on the second component carrier is indicated by a Physical Downlink Control Channel (PDCCH) on a first component carrier from the plurality of component carriers, wherein the first component carrier and the second component carrier are an anchor carrier designated for the UE;

code for sending the control transmission and the data transmission that includes the jointly encoded layer 3 control information on the anchor carrier, wherein the data transmission is scheduled by the control transmission;

code for using Downlink Control Information (DCI) format IA for the control transmission sent on the anchor carrier when the data transmission that includes the jointly encoded layer 3 control information is a Physical Downlink Shared Channel (PDSCH); and code for inhibiting use of the DCI format IA for a disparate control transmission sent on a non-anchor carrier when the disparate control transmission includes disparate separately encoded layer 2 control information that indicates a disparate allocation for a disparate PDSCH that includes UE-specific non-layer 3 signaling traffic.

24. The computer program product of claim 23, wherein the computer-readable medium further comprises code for sending the PDCCH that includes separately encoded layer 2 control information on the first component carrier from the plurality of component carriers, wherein the data transmission is a Physical Downlink Shared Channel (PDSCH).

25. The computer program product of claim 23, wherein the computer-readable medium further comprises code for receiving the PDCCH that includes separately encoded layer 2 control information on the first component earlier from the plurality of component carriers, wherein the data transmission is a Physical Uplink Shared Channel (PUSCH).

* * * * *